US00RE34947E

United States Patent [19]

Takanashi et al.

[11] E Patent Number: Re. 34,947

[45] Reissued Date of Patent:* May 23, 1995

[54] LIGHT-TO-LIGHT CONVERSION ELEMENT PROVIDED WITH WAVELENGTH SELECTING REFLECTION LAYER AND IMAGING DEVICE PROVIDED WITH THE LIGHT-TO-LIGHT CONVERSION ELEMENT

[75] Inventors: Itsuo Takanashi, Kamakura; Shintaro Nakagaki, Miura; Hirohoko Shionaga, Utsunomiya; Masato Furuya, Yokohama; Tsutou Asakura, Yokohama; Testuhi Suzuki, Yokosuka, all of Japan

[73] Assignee: Victor Company of Japan, Ltd., Yokohama, Japan

[ * ] Notice: The portion of the term of this patent subsequent to has been disclaimed.

[21] Appl. No.: 128,009

[22] Filed: Sep. 28, 1993

Related U.S. Patent Documents

Reissue of:

[64] Patent No.: 5,124,545
Issued: Jun. 23, 1992
Appl. No.: 4,97,,164
Filed: Mar. 22, 1990

[30] Foreign Application Priority Data

Mar. 23, 1989 [JP] Japan ..... 1-71170
Mar. 23, 1989 [JP] Japan ..... 1-71171
Jun. 16, 1989 [JP] Japan ..... 1-153775

[51] Int. Cl.[6] ..... H01J 40/14
[52] U.S. Cl. ..... 250/214 LA; 359/72
[58] Field of Search ..... 250/214 LA, 226; 359/38, 66, 70, 72; 345/44, 45, 49

[56] References Cited

U.S. PATENT DOCUMENTS 3,666,881 5/1972 Stein ..... 250/213 R
4,127,322 11/1978 Jacobsen et al. ..... 350/342
4,150,876 4/1979 Yevick ..... 250/213 R
4,185,894 1/1980 Hilton et al. ..... 350/338
4,368,386 1/1983 Huignard et al. ..... 250/213 R
4,481,531 11/1984 Warde et al. ..... 250/213 R
4,920,417 4/1990 Takanashi et al. ..... 358/213.13
4,989,076 1/1991 Onada et al. ..... 350/338

FOREIGN PATENT DOCUMENTS 0273773 7/1988 European Pat. Off. .
0327236 8/1989 European Pat. Off. .
2539651 3/1976 Germany .
663339 10/1940 United Kingdom .

OTHER PUBLICATIONS

Optical Engineering, vol. 17, No. 4, pp. 371-384, Jul.-Aug. 1978, W. P. Bleha et al., "Application of the Liquid Crystal Light Valve to Real-Time Data Processing".

Applied Optics, vol. 21, No. 20, pp. 3706-3712, Oct. 1982 P. Aubourg et al., "Liquid Crystal Light Valve Using Bulk Monocrystalline Bi12 $Sio_2O$ as Photoconductive Material".

*Primary Examiner*—David D. Nelms
*Attorney, Agent, or Firm*—Lowe, Price, LeBlanc & Becker

[57] ABSTRACT

A light-to-light conversion element which includes at least a photoconductive layer and a photo-modulation layer and in which light incident on these layers is reflected by a reflection layer and in which a selective reflection characteristic corresponding to color separation is given to the reflection layer. Thereby, among the light incident on the photoconductive layer and the photo-modulation layer, light having wavelength of the specific region is selectively reflected by the reflection layer, so that the write and read operation of information is performed on the selected light.

13 Claims, 11 Drawing Sheets

LIGHT-TO-LIGHT CONVERSION ELEMENT PROVIDED WITH WAVELENGTH SELECTING REFLECTION LAYER AND IMAGING DEVICE PROVIDED WITH THE LIGHT-TO-LIGHT CONVERSION ELEMENT

Matter enclosed in heavy brackets [ ] appears in the original patent but forms no part of this reissue specification; matter printed in italics indicates the additions made by reissue.

*The instant application is a reissue of U.S. Pat. No. 5,124,545.* The instant application is related to the copending U.S. patent application Ser. No. 313,073, *now U.S. Pat. No. 4,920,417.*

1. Field of the Invention

This invention generally relates to a light-to-light conversion element and an imaging device and more particularly to a light-to-light conversion element suitable for a high resolution image displaying device or imaging device, which stores information represented by an electromagnetic wave signal such as light by making electric charge correspond to the information and then reads the information as an electromagnetic wave signal, and to an imaging device using such a light-to-light element.

2. Description of The Related Art

Referring first to FIG. 8, there is shown an example of a light-to-light conversion device of the related art, in which information represented by an electromagnetic wave signal such as light by generating electric charge corresponding to the information is stored and then the information is read by using an electromagnetic wave signal such as light. This example is disclosed in Japanese Patent Application filed on May 16, 1989, by Applicant of the instant application.

As shown in this figure, this light-to-light conversion device includes a surface conversion element 10 and a light-to-light conversion element 12. Further, as indicated by an arrow F1, electro-magnetic flux signals representing various information including time series information are scanned and are then incident on the surface conversion element 10 whereon the times series information is recorded and then converted into surface information. Subsequently, the surface information on each recorded surface of the element 10 is outputted to the light-to-light conversion element 12 as indicated by an arrow F2.

From the light-to-light conversion element 12, the surface information recorded on each surface of the element 10 and inputted thereto is read by using read light inputted thereto as indicated by an arrow F3. Thus, the light incident on the light-to-light conversion device as indicated by the arrow F1 is converted into another light indicated by an arrow F4 and is outputted therefrom. Thereby, the time series information is converted into the surface information.

The read light indicated by the arrow F4 is projected onto a screen (not shown) and then a corresponding image is displayed thereon.

However, in the light-to-light conversion device of the related art as above described, the reflection of the read light is not always favorably performed. For instance, the device of the related art has a defect that even when light having wavelength different from wavelength of the read light is incident thereon, the reflection of such light is effected and thus a high contrast cannot be obtained. The present invention is accomplished to eliminate such a defect of the related art.

Therefore, it is an object of the present invention to provide a light-to-light conversion element which can give a high contrast to an image obtained from image information such as color information.

Incidentally, as examples of application of a conventional wavelength conversion element or device for converting an invisible electro-magnetic radiation beam such as light to a visible electro-magnetic radiation beam, there can be cited a device disclosed in the specification of the U. K. patent No. 663339 in which an X-ray image is displayed on a television monitoring receiver by using a wavelength conversion device, and also can be cited a well known noctovision. However, such a wavelength conversion element or device has drawbacks that the construction thereof is complex and that it is difficult to obtain a high definition visible image. The present invention is accomplished to eliminate such drawbacks of the conventional element or device.

Therefore, it is another object of the present invention to provide a light-to-light conversion element or device which has simple construction and can obtain a high definition visible image.

Further, as examples of a light-to-light conversion element of the related art constructed in such a manner to input an optical image and output an optical image, can be cited microchannel spatial light modulators such as a liquid crystal type photo-modulation device, photoconductive Pockels effect element and a microchannel type photo-modulation device and elements made from photocromics material. Such light-to-light elements have been noticed as elements for use in a photo-writing projector, an optical computer and so on. Further, the assignee of the instant application has proposed a high resolution imaging device using a light-to-light conversion element.

FIG. 14 is a schematic sectional side view of a light-to-light conversion element of the related art, which is proposed to eliminate the drawbacks of the conventional element or device as described immediately above (More detailed practical construction of the light-to-light conversion element of the present invention accomplished to eliminate the drawbacks of the conventional element or device as described immediately above will be explained later). In this figure, reference numerals 201 and 202 denote glass-plates; 203 and 204 transparent electrodes; 205, 206 and 211 terminals; 207 a photoconductive material layer member; 208 a dielectric mirror; 209 an optical member (for example, photo-modulation material such as a single crystal of lithium niobate or a nematic liquid crystal) capable of changing the state of light correspondingly to the field strength of the applied power source; WL a write light; RL a read light; and EL light for erasure of electric charges generated in the light-to-light conversion device PPC.

In FIG. 14, the direction of the light (hereunder sometimes referred to as erasure light) EL for the erasure of the generated electric charges is shown as the same as that of the read light RL. This shows the direction of the incidence of the light for the erasure on the conversion element in case where the dielectric mirror 208 having a light transmission characteristic as shown in FIG. 15 is used. Incidentally, it is apparent that the direction of the incidence of the light used for the erasure of the charge image is same as that of the incidence of write light in case of the conversion elements constructed such that the light used for the erasure of the charge image is incident thereon in the same direction as that of the incidence of write light.

Further, when optical information is written into the conversion element of FIG. 14, a circuit consisting of a power source 210 and a switch SW is connected to the terminals 205 and 206 of the light-to-light conversion element. Further, a movable contact of the switch SW is placed in the position of a fixed contact WR in accordance with a switch control signal supplied at an input terminal 211 of the switch SW. Then, a voltage from the power source 210 is applied across the transparent electrodes 203 and 204 such that an electric field be applied across the photoconductive material layer 207. Hereupon, a write operation of writing the optical information into the conversion element is performed by making write light beam WL be incident on the glass-plate 201 of the conversion element.

Namely, the write light WL, which has been incident on the conversion element as above described, passes through the glass-plate 201 and the transparent electrode 203 and reaches the photoconductive layer material member 207. At that time, the electric resistance of the photoconductive material layer member 207 changes correspondingly to an optical image formed by the incident light WL having reached thereto, so that electric charges corresponding to the optical image formed by the incident light having reached thereto are generated on the boundary surface between the photoconductive material layer member 207 and the dielectric mirror 208.

The reproduction of the optical information written into the conversion element in the form of the charge image corresponding to the optical image formed by the incident light is performed by projecting read light RL having constant intensity onto the glass-plate 202 from a light source (not shown) under conditions that the movable contact of the switch SW is placed in the position of the fixed contact WR thereof and the voltage from the power source 210 is applied across the transparent electrodes 201 and 202.

As above described, the charge image corresponding to the optical image formed by the incident light reached thereto is generated on the boundary surface between the photoconductive material layer member 207 and the dielectric mirror 208 of the conversion element into which the optical information is written by using the incident light, so that an electric field having strength distribution corresponding to the optical image is applied to the photo-modulation material layer member 209 (for example, the single crystal of lithium niobate 209) which is connected in series to the photoconductive material layer member 207 along with the dielectric mirror 208.

Further, the refractive index of the single crystal of lithium niobate 209 changes due to electrooptic effects correspondingly to an electric field. Therefore, when the electric field having strength distribution corresponding to the charge image is applied to the single crystal of lithium niobate 209 which is connected in series to the photoconductive material layer member 207 along with the dielectric mirror 208, the refractive index of the single crystal of lithium niobate 209 changes in accordance with the charge image corresponding to the optical image formed by the incident light reached thereto.

Moreover, when the read light RL is projected on the glass-plate 202, the read light RL projected on the glass-plate 202 propagates through the transparent electrode 204, the single crystal of lithium niobate 209 and the dielectric mirror 208 in this order. Subsequently, the read light RL is reflected by the dielectric mirror 208 and then returns to the glass-plate 202 as reflected light. However, as above described, the refractive index of the single crystal of lithium niobate 209 changes due to the electrooptic effects correspondingly to the electric field. Thus, the reflected read light RL comes to include information corresponding to the strength distribution of an electric field applied to the single crystal of lithium niobate 209 by the electrooptic effects of the single crystal of lithium niobate 209 and further forms a reproduced optical image corresponding to the optical image, which is formed by the incident light on the glass-plate 202.

As is apparent from the foregoing description, the dielectric mirror 208 of the conversion element reflects the read light RL, which has been incident on the photo-modulation material layer member 209 from the side of the transparent electrode 204, thereby preventing the read light from transmitting through the photo-modulation material layer member 209 and the photoconductive material layer member 207.

Further, can be prevented the occurrence of a problem to be resulted from the transmission of the read light RL through the photo-modulation material layer member 209 and the photoconductive material layer member 207, that is, a problem that the charge image is disturbed by transmitting through the photo-modulation material layer member 209 and the photoconductive material layer member 207. Incidentally, in a related art light-to-light conversion element, a light insulating film is provided in place of a dielectric mirror.

Thus, light which is incident on the photoconductive layer and the photo-modulation layer is selectively reflected by the reflection layer. Thereby, a writing of and a reading of information can be selectively effected in response only to light of specific wavelength. Moreover, information having a high contrast ratio can be obtained without degrading a resolution.

Furthermore, erasure of the information written by using the write light is effected by supplying a switch control signal to the input terminal 211 of the switch SW to place the movable contact of the switch SW in the fixed contact E thereof, then equalizing electric potentials of the terminals 205 and 206 of the conversion element in such a manner to prevent the generation of an electric field and further making the erasure light EL having uniform strength distribution be incident on the glass-plate 201, on which the write light WL has been incident. Further, in case where the characteristic of transmittance of light through the dielectric mirror 208 with respect to wavelength of light is just as shown in FIG. 15 with reference to the read and write light RL and EL, the erasure of the information written by using the write light is effected by making the erasure light EL having uniform strength distribution be incident on the glass-plate 202 as shown in FIG. 14.

As above described, in this light-to-light conversion element of the related art, a dielectric mirror (or a light insulating film) is provided between the photo-modulation material layer member 209 and the photo-conductive material layer member 207 in order to prevent the charge image from being disturbed by transmitting through the photo-modulation material layer member 209 and the photo-conductive material layer member 207. However, in case where a dielectric mirror (or a light insulating film) is provided between the photo-modulation material layer member 209 and the photo-conductive material layer member 207, the electric field occurring due to the charge image on the boundary surface between and the photo-conductive material layer member 207 and the dielectric mirror 208 is expanded by the presence of the dielectric mirror (or the light insulating film) having film thickness and such an expanded electric field is applied to the photo-modulation material layer member 209. Further, the electric field occurring due to the charge image on the boundary surface between the photo-modulation material layer member 209 and the photo-conductive material layer member 207 is also expanded by the fact that impedance of the dielectric mirror 208 (or the light insulating film) is finite. As a result, resolution of the device is decreased. The present invention is accomplished to resolve such a problem of the device of the related art.

Accordingly, it is still another object of the present invention to provide a light-to-light conversion device wherein the dielectric mirror, which is an important factor of deterioration in resolution and of reduction in contrast, is omitted and further the photoconductive material layer member is directly piled on the photo-modulation material layer member.

SUMMARY OF THE INVENTION

To achieve the foregoing object and in accordance with a first aspect of the present invention, there is provided a light-to-light conversion element which includes at least a photoconductive layer and a photo-modulation layer and in which light incident on these layers is reflected by a reflection layer and in which a selective reflection characteristic corresponding to color separation is given to the reflection layer. That is, a characteristic of reflecting light of a specific region of wavelength is given to the reflection layer.

Further, in accordance with a second aspect of the present invention, there is provided an imaging apparatus or image displaying apparatus including a light-to-light conversion element, which includes at least a photo-conductive layer and a photo-modulation layer and in which light incident on these layers is reflected by a reflection layer and in which a selective reflection characteristic corresponding to color separation is given to the reflection layer, wherein write light having wavelength of a selected region and including image information is incident on the light-to-light conversion element and is used to write the image information into the light-to-light element and wherein read light having wavelength of a selected region is incident on the light-to-light conversion element and is used to read the image information into the light-to-light element.

Thereby, among the light incident on the photo-conductive layer and the photo-modulation layer, light having wavelength of the specific region is selectively reflected by the reflection layer, so that the write and read operation of information is performed on the selected light.

Further, in accordance with a third aspect of the present invention, there is provided a light-to-light conversion element wherein a photo-conductive material layer member sensitive to at least an invisible electro-magnetic radiation beam and a photo-modulation material layer member capable of changing the state of at least a visible electro-magnetic radiation beam in accordance with field strength distribution are provided between two electrodes.

Moreover, in accordance with a fourth aspect of the present invention, there is provided a light-to-light conversion device which includes a light-to-light conversion element, in which a photo-conductive material layer member sensitive to at least an invisible electro-magnetic radiation beam and a photo-modulation material layer member capable of changing the state of at least a visible electro-magnetic radiation beam in accordance with field strength distribution are provided between two electrodes, and an invisible beam incidence means for making an invisible electro-magnetic radiation beam be incident on the photo-conductive material layer member and generating electric charges (thus, an image (hereunder referred to as a charge image) represented by the charge distribution) and a visible beam incidence means for making a visible electro-magnetic radiation beam be incident on the photo-modulation material layer member, to which an electric field caused by the electric charge is applied, and a visible beam outputting means for making the photo-modulation material layer member output a visible electro-magnetic radiation beam.

Thus, when a predetermined voltage is applied across the electrodes of the conversion element, an invisible electro-magnetic radiation beam is incident on the photo-conductive material layer member to generate electric charges (and thus an image represented by electric charge distribution) corresponding to the invisible electro-magnetic radiation beam and then a visible electro-magnetic radiation beam is incident on the photo-modulation material layer member, to which an electric field caused by the electric charges is applied, and further a visible electro-magnetic beam is outputted from the photo-modulation material layer member.

Thereby, there can be provided a light-to-light conversion element or device which has simple structure and can easily obtain an optical image with a high resolution. Further, in contrast with the light-to-light conversion element or device in accordance with the first aspect of the present invention, the manufacturing of the light-to-light conversion element or device in accordance with the third or fourth aspect of the present invention is easier than that of the light-to-light conversion element in accordance with the first aspect of the present invention. This is because of the facts that an intermediate reflecting layer of the light-to-light conversion element in accordance with the third aspect of the present invention does not have a selective reflection characteristic but performs total reflection and that thus there is no necessity of selecting material having a desired selective reflection characteristic for the intermediate reflecting layer of the light-to-light conversion element in accordance with the third aspect of the present invention. Moreover, by using the light-to-light conversion element or device in accordance with the third or fourth aspect of the present invention, an image formed by an invisible electro-magnetic radiation beam can be displayed as a visible image.

Furthermore, in accordance with a fifth aspect of the present invention, there is provided a light-to-light conversion element wherein a photoconductive material layer member sensitive to at least an electro-magnetic radiation beam to be used for writing information and insensitive to at least an electro-magnetic radiation beam to be used for reading information and a photo-modulation material layer member capable of changing the state of at least the electro-magnetic radiation beam for reading the information in accordance with field strength distribution are provided between two electrodes.

Further, in accordance with a sixth aspect of the present invention, there is provided an imaging device which includes a light-to-light conversion element, in which a photoconductive material layer member sensitive to at least an electro-magnetic radiation beam to be used for writing information and insensitive to at least an electro-magnetic radiation beam to be used for reading information and a photo-modulation material layer member capable of changing the state of at least the electro-magnetic radiation beam to be used for reading the information in accordance with field strength distribution are provided between two electrodes, a charge image generating means for making the electro-magnetic radiation beam to be used for writing information be incident on the photoconductive material layer member and generating a charge image corresponding to the electro-magnetic radiation beam to be used for writing information, a read beam input means for making the electro-magnetic radiation beam to be used for reading the information be incident on the photo-modulation material layer member, to which an electric field occurring due to the charge image, and a read beam output means for issuing the electro-magnetic radiation beam to be used for reading the information from the photo-modulation material layer member.

Thus, in the light-to-light conversion element in which a photoconductive material layer member sensitive to at least an electro-magnetic radiation beam to be used for writing information and insensitive to at least an electro-magnetic radiation beam to be used for reading information and a photo-modulation material layer member capable of changing the state of at least the electro-magnetic radiation beam to be used for reading the information in accordance with field strength distribution are provided between two electrodes, the electro-magnetic radiation beam to be used for writing information is made to be incident on the photoconductive material layer member and further a charge image corresponding to the electro-magnetic radiation beam to be used for writing information is generated. Then, the electro-magnetic radiation beam to be used for reading the information is made to be incident on the photo-modulation material layer member, to which an electric field occurring due to the charge image, and further the electro-magnetic radiation beam to be used for reading the information is issued from the photo-modulation material layer member.

Thereby, can be prevented reduction in resolution of the imaging device resulted from the expansion of the electric field occurring due to the charge image on the boundary surface between the photomodulation material layer member and the photoconductive material layer member, which is caused by the presence of the electric mirror (or the light insulating film) having film thickness, and resulted from the application of such an expanded electric field to the photo-modulation material layer member in case of using the conventional light-to-light conversion element where a dielectric mirror (or a light insulating film) having film thickness is provided between the photomodulation material layer member and the photoconductive material layer member. Further, can be also prevented reduction in resolution of the imaging device resulted from the expansion of the electric field occurring due to the charge image on the boundary surface between the photomodulation material layer member 209 and the photoconductive material layer member, which is caused by the fact that impedance of the dielectric mirror (or the light insulating film) is finite. Thus, the present invention can provide an imaging device which is easily able to obtain an image reproduced with a high-resolution and high-contrast. Incidentally, in contrast with the light-to-light conversion element or device in accordance with the first aspect of the present invention, the manufacturing of the light-to-light conversion element or device in accordance with the fifth aspect of the present invention is easier than that of the light-to-light conversion element in accordance with the first aspect of the present invention, for the same reason as above described with respect to the light-to-light conversion element in accordance with the third aspect of the present invention. Further, by using the light-to-light conversion element or device in accordance with the fifth aspect of the present invention, an image formed by an invisible electro-magnetic radiation beam can be displayed as a visible image.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF PREFERRED EMBODIMENTS

Figure 1:
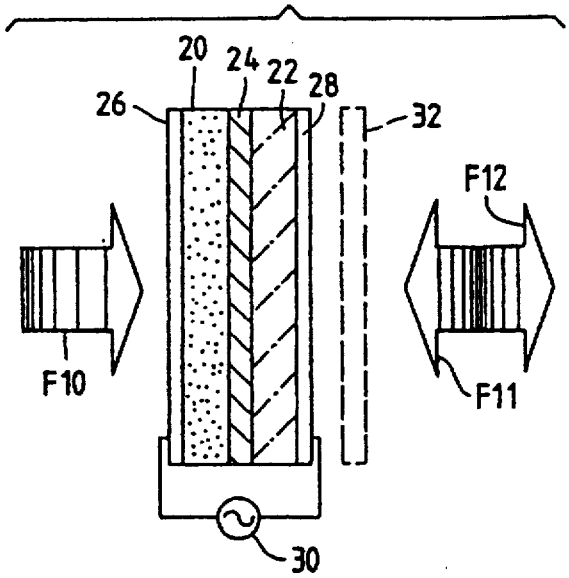
FIG. 1 is a diagram for illustrating the basic construction of a light-to-light conversion device according to the present invention.

Hereinafter, preferred embodiments of the present invention will be described in detail by referring to the accompanying drawings.

Before explaining the respective preferred embodiments of the present invention, the basic structure of the embodiments will be first described hereinbelow by referring to FIG. 1. As shown in this figure, a dielectric mirror 24 which reflects light having wavelength of a specific region is provided between a photoconductive layer 20 and a photo-modulation layer 22. Practical examples of such a dielectric mirror are disclosed in the copending U.S. patent application Ser. No. 313,073 and "Applied Optics", pp. 95–98, by Hiroshi Kubota, published by IWANAMI SHOTEN on Dec. 19, 1959. This laminating body is interposed between electrodes 26 and 28, to which an a. c. power source 30 for use in a read operation (especially, in case of a crystal liquid) is provided.

Among these composing elements, the photoconductive layer 20 is made from, for example, amorphous silicon, bismuth silicate or the like. Thereby, electric charge corresponding to quantity of incident light is formed. Further, the photo-modulation layer 22 is made from an electrooptic crystal of, for example, lithium niobate, or from a liquid crystal polymer such as a twisted nematic (TN) liquid crystal polymer and a liquid crystal operating in a scattering mode or a ferroelectric liquid crystal. The photo-modulation layer 22 modulates the incident light by using electrooptic effects corresponding to the influence of an electric field caused by the charge generated in the photoconductive layer 20.

Incidentally, a scattering state corresponding to write light may be read or known by using, for instance, a polymer-liquid-crystal-complex film as a liquid crystal operating in a scattering mode.

Moreover, the dielectric mirror 24 is made up of laminate bodies of, for instance, $TiO_2$-$SiO_2$ and ZnS-$MgF_2$ and has a wavelength selection characteristic of reflecting light having a necessary wavelength. The wavelength selection characteristic can be provided to the dielectric mirror by changing refractive indices of dielectric laminate films and the number of layers of each dielectric component. In this case, a reflecting film can be formed in such a manner to be very thin. Namely, a thickness of the reflecting film can be approximately 0.5 to 2 microns ($\mu$). Further, influence of light leaking to a photoconductive layer may be suppressed as far as possible by preliminarily limiting a range of wavelength of light incident on this reflecting film by using, for example, a dichroic filter. Incidentally, a polarizing plate 32 is provided at the side of the electrode 28 if necessary.

Next, an outline of an operation of the conversion element above described will be explained hereinbelow. First, when write light is incident on the photoconductive layer 20 as indicated by an arrow F10 in FIG. 1, pairs of electrons and holes are generated correspondingly to the magnitude of the incident light. The electrons and holes are separated by an electric field caused by a voltage (not shown) applied to the electrodes 26 and 28, and either the electrons or the holes are moved to the boundary between the photoconductive layer 20 and the dielectric mirror 24.

Then, an electric field is generated in the photomodulation layer 22 by the charges. Thus, the device is put into a state in which electrooptical effects corresponding to a quantity of consequently stored charges can occur. Hereupon, if the read light is incident on the layer 22 as indicated by an arrow F11 in FIG. 1, the incident light is modulated by such electrooptical effects and further the modulated light is reflected by the dielectric mirror 24 and is outputted as indicated by an arrow F12.

Namely, image information included in the write light is stored in the photoconductive layer 20 in the form of the separated electric charge. Thereby, the stored image information becomes included in the read light by the light modulation in the photo-modulation layer 22. Thus, the light-to-light conversion of an image is performed.

As above stated, in the device of the present invention, the dielectric mirror 24 is formed in such a manner to have a predetermined wavelength selection characteristic. For example, only red light (R) can be selected from the incident light and can be reflected. Thus, the red light, which is incident on the device as the write light or the read light, is favorably reflected by the dielectric mirror 24. Namely, in the device of the present invention, operations of writing and reading information are selectively performed on only light having a specific wavelength. Thus, even if green light (G) or blue light (B) is accidentally incident on the device, the incident light is not reflected. As a result, a high contrast can be given to the resultant image. Apparently, it is the same with cases in which green light or blue light is used as the read light or the write light instead of red light.

Next, a first embodiment of the present invention will be described in detail by referring to FIG. 2, which shows a main part of the first embodiment, and to FIG. 3, which shows the whole construction of the first embodiment.

Figure 2:
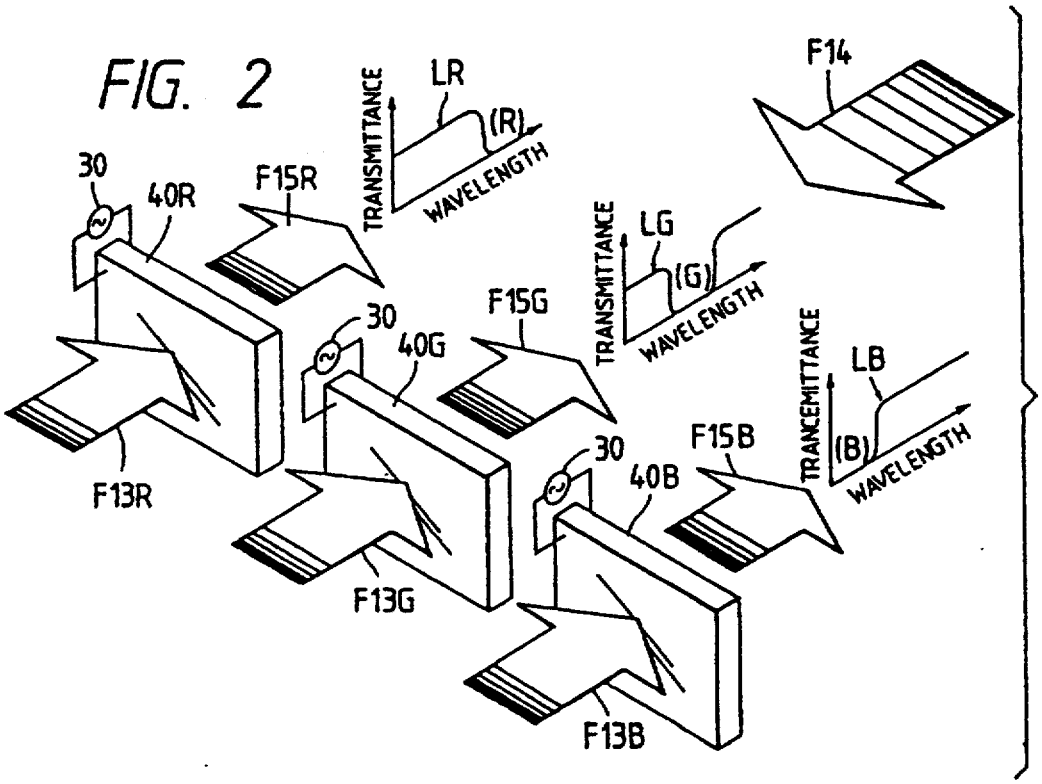
FIGS. 2 and 3 are diagrams for illustrating the construction of a first embodiment of the present invention.
Figure 3:
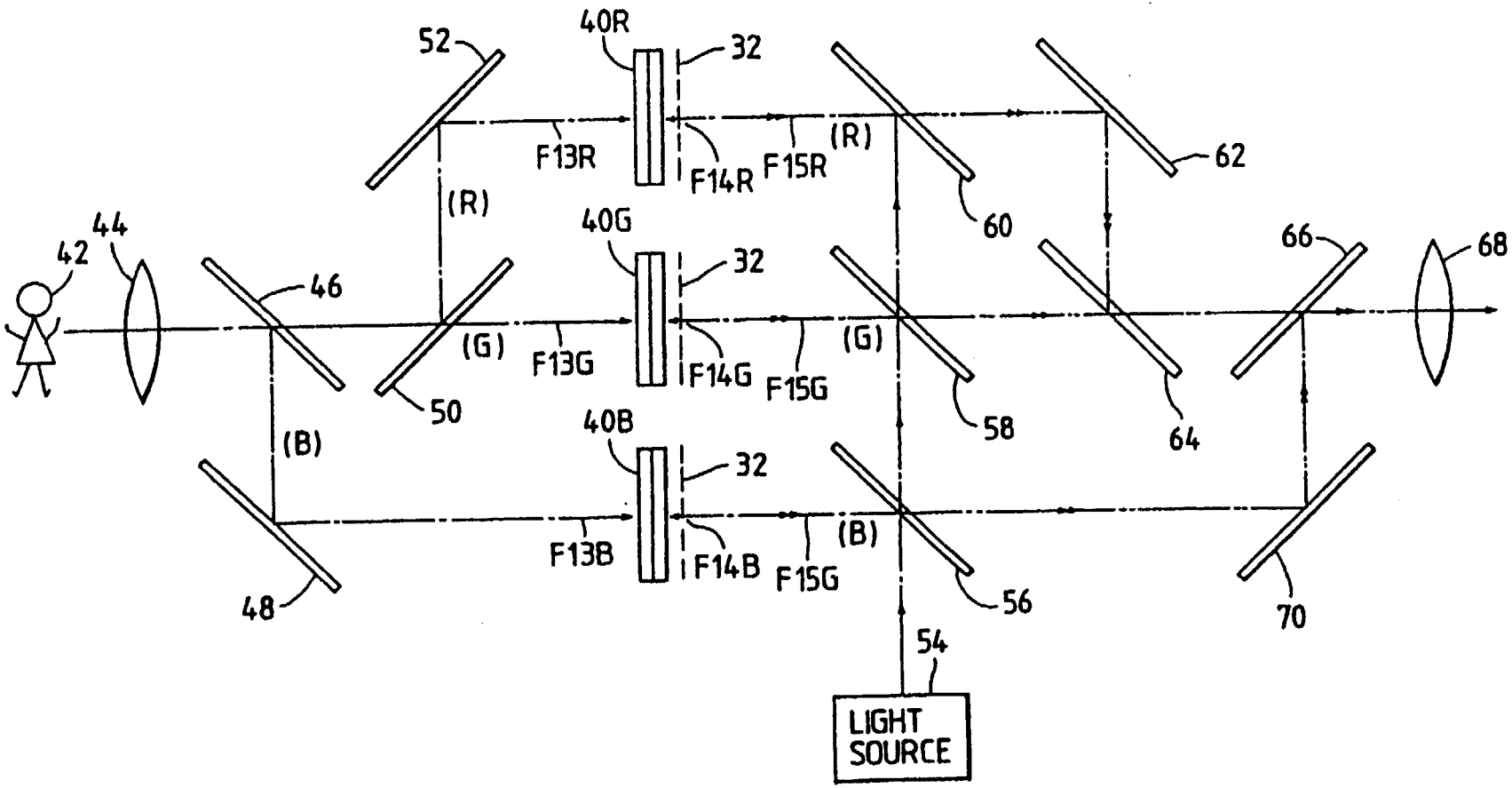

Referring to FIG. 2, each of light-to-light conversion elements 40R, 40G and 40B is essentially constructed as shown in FIG. 1, though the wavelength selection characteristics of dielectric mirrors of these elements 40R, 40G and 40B are different from each other.

First, the dielectric mirror of light-to-light elements 40R has a wavelength characteristic in which red light R is not transmitted therethrough but reflected as shown in a graph LR. Next, that of the light-to-light elements 40G has a wavelength characteristic in which green light G is not transmitted therethrough but reflected as shown in a graph LG. Further, that of the light-to-light elements 40B has a wavelength characteristic in which green light B is not transmitted therethrough but reflected as shown in a graph LB.

To these light-to-light conversion elements 40R, 40G and 40B, a voltage is applied from an a. c. power source 30 at the time of reading information. Write light is incident on these elements 40R, 40G and 40B from the directions indicated by arrows F13R, F13G and F13B in this figure, respectively. Further, from the direction indicated by an arrow F14, read light is incident on the elements 40R, 40G and 40B. The read light is selectively reflected by the dielectric mirrors of the light-to-light conversion elements 40R, 40G and 40B and is outputted as indicated by arrows F15R, F15G and F15B. Similarly, write light is selectively reflected.

Next, referring to FIG. 3, the whole construction of this embodiment will be described hereinbelow. Write light issued from a predetermined object 42 is incident on a dichroic mirror 46, which separates blue light B therefrom, through a suitable optical system 44. The separated blue light B is reflected by a reflecting mirror 48 and is then incident on the light-to-light element 40B.

Next, in the light which passes through the dichroic mirror 46, red light R is reflected by a dichroic mirror 50 and is further reflected by a reflecting mirror 52 and is finally incident on the light-to-light conversion element 40R. On the other hand, green light transmitted throughs the dichroic mirror 50 and is then incident on the light-to-light conversion element 40G.

By the foregoing construction, the write light from the object 42 is separated into the light R, G and B which are respectively incident on the corresponding light-to-light elements 40R, 40G and 40B.

Next, the red read light R for the light-to-light conversion element 40R, the green read light G for the light-to-light conversion element 40G and the blue read light B for the light-to-light conversion element 40B are obtained by the color separation of white light (or light obtained by mixing red, green and blue light), which is outputted from a light source 54, by the dichroic mirrors 56 and 58. Further, the red light R is reflected by a semi-transparent mirror 60 and is then incident on the light-to-light conversion element 40R.

Further, the rays of read light reflected by the light-to-light conversion elements 40R, 40G and 40B pass through the semi-transparent mirror 60 and the dichroic mirrors 58 and 56, respectively. Among the read light R, G and B, the ray of the red read light R, which has passed through the semi-transparent mirror 60, is further reflected by a reflecting mirror 62, a semi-transparent mirror 64, and then passes through a semi-transparent mirror 66 and is further incident on a projecting optical system 68. Moreover, the green read light G, which has passed through the dichroic mirror 56, further passes through semi-transparent mirrors 64 and 66 and is then incident on the projecting optical system 68. Furthermore, the blue read light B, which has passed through the dichroic mirror 56, is then reflected by a reflecting mirror 70 and a semi-transparent mirror 66 and is further incident on the projecting optical system 68.

By using these composing portions of the device, is performed the incidence of the rays of the read light R, G and B respectively on the light-to-light conversion elements 40R, 40G and 40B, as well as the synthesis of the rays of the read light R, G and B reflected respectively by the light-to-light conversion elements 40R, 40G and 40B. Incidentally, the synthesized read light is projected on a screen (not shown).

Next, an operation of the thus constructed first embodiment will be described hereinbelow. First, the write light from the object 42 is separated into the red, green and blue light R,G and B by the mirrors 46, 48, 50 and 52. Further, the rays of the write light R, G and B are respectively incident on the light-to-light conversion elements 40R, 40G and 40B. Thereby, information on red, green and blue images of the object 42, which corresponds to electric charge to be stored in the light-to-light conversion elements, is written into the elements 40R, 40G and 40B, respectively. At that time, the light R, G and B is selectively reflected by each of the dielectric mirrors of the light-to-light conversion elements 40R, 40G and 40B, so that the information is selectively written into the elements.

Then, the rays of the read light R, G and B obtained by the color separation of the light, which comes from the light source 54, effected by the mirrors 56, 58 and 60 are respectively incident on the light-to-light conversion elements 40R, 40G and 40B into which the information is written. Among these rays of the read light, the rays of the red read light R is incident on the light-to-light conversion element 40R but is effectively reflected by the element 40R because the dielectric mirror of the element 40R is constructed in such a manner to selectively reflect the read light, namely, in such a manner to reflect the red read light R. It is similar to cases where the read light is the green read light G or the blue read light B. The read light is synthesized by the mirrors 62, 64, 66 and 70, and then a color image is projected on the predetermined screen by using the projecting optical system 68.

As above described, the write operation of writing the information into and the read operation of reading the information from the light-to-light elements 40R, 40G and 40B are selectively performed on the light R, G and B, so that information on each of red, green and blue images having a high contrast can be displayed.

Figure 4:
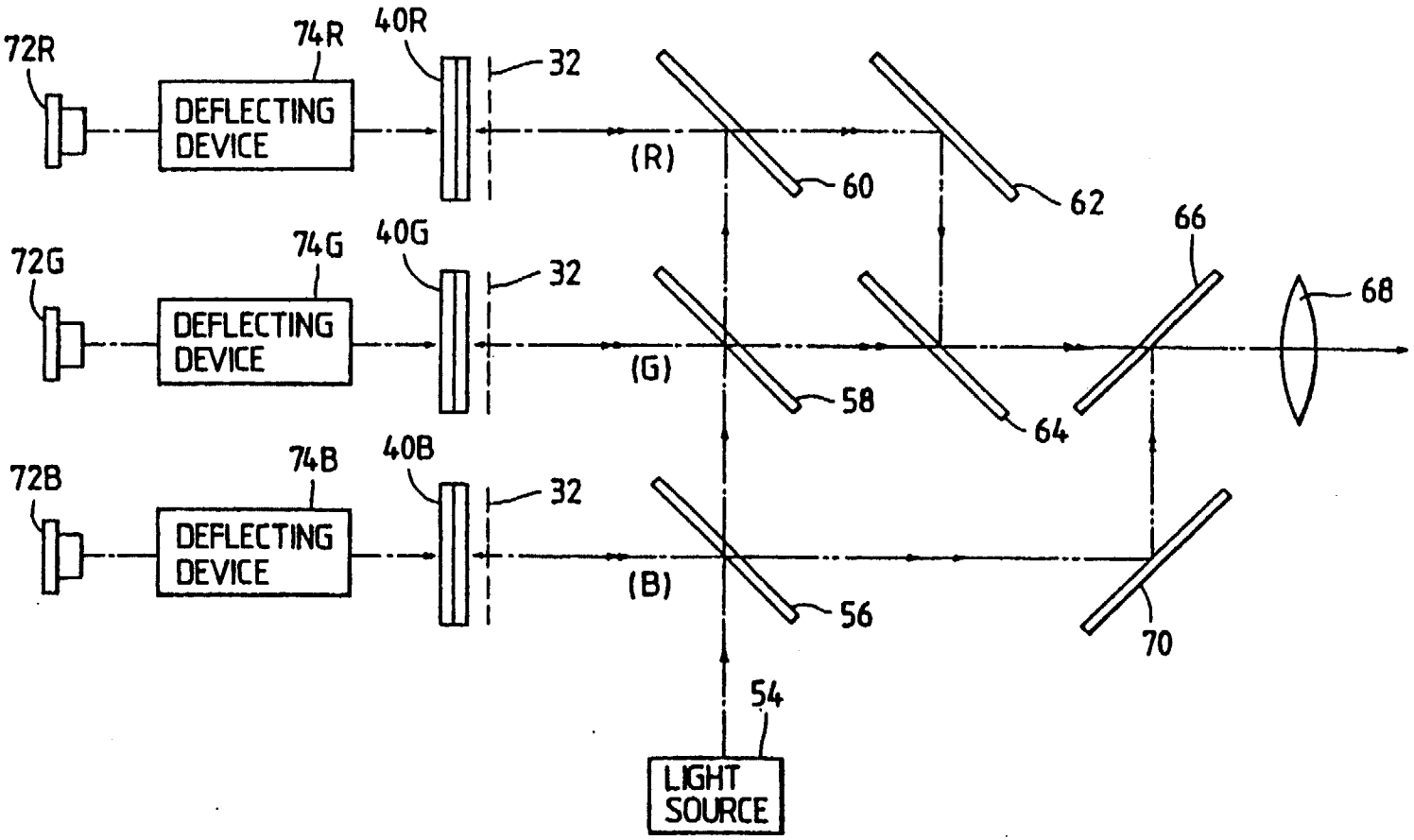
FIG. 4 is a diagram for showing the construction of a second embodiment.

Next, a second embodiment of the present invention will be described in detail by referring to FIG. 4. Incidentally, in this figure, like reference characters designate like or corresponding composing portions of the first embodiment. (Further, it is the same with figures showing the construction of other embodiments which will be described later.)

This second embodiment is adapted to process time series information by effecting the scan by deflecting write light. In this figure, a write operation of writing the information on a red, green and blue images of an object into the light-to-light elements 40R, 40G and 40B *is performed* effecting the scan by deflecting write laser light, which is outputted from laser light sources or light sources such as light emitting diodes (LEDs) 72R, 72G and 72B, by using deflecting devices 74R, 74G and 74B. The information is included in the red, green blue laser light R, G and B in the time series manner. Further, a read operation of reading the information from the light-to-light conversion elements 40R, 40G and 40B of this embodiment is effected similarly as in case of the first embodiment.

Figure 5:
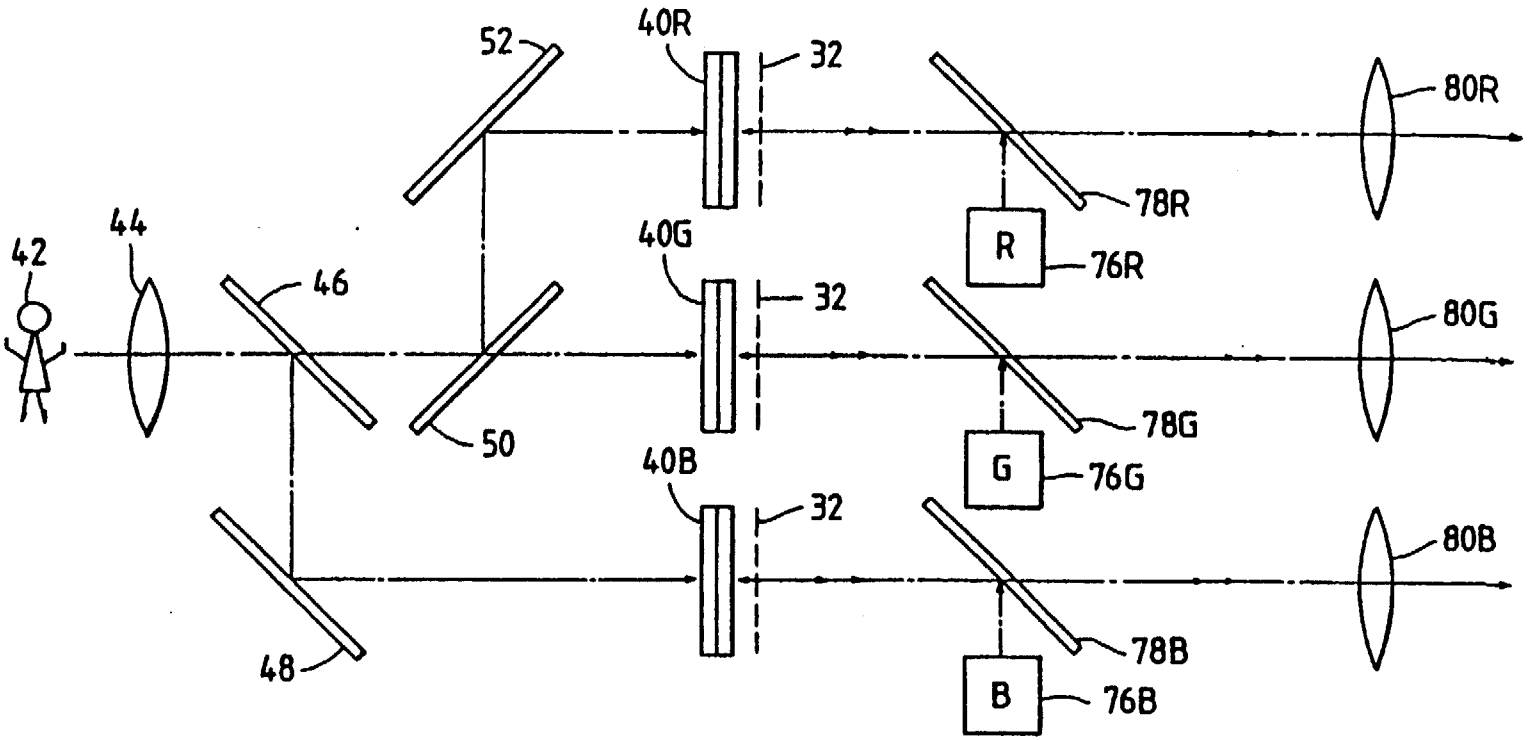
FIG. 5 is a diagram for showing the construction of a third embodiment of the present invention.

Next, a third embodiment of the present invention will be described in detail hereinbelow by referring to FIG. 5. This embodiment is adapted to project the read light R, G and B on a screen and effect the color synthesis on the screen.

In this figure, the incidence of the write light on the light-to-light conversion elements 40R, 40G and 40B is preformed similarly as in case of the first embodiment. In contrast with this, the incidence of the read light on the light-to-light conversion elements 40R, 40G and 40B is effected by reflecting the read light R, G and B outputted from the light sources 76R, 76G and 76B by the semi-transparent mirrors 78R, 78G and 78B, respectively. Incidentally, it goes without saying that each of the semi-transparent mirrors 76R, 76G and 76B can be replaced with a polarization beam splitter.

Further, the rays of the read light R, G and B reflected by the light-to-light elements 40R, 40G and 40B and outputted therefrom respectively pass through the semi-transparent mirrors 78R, 78G and 78B and are respectively incident on the projecting optical systems 80R, 80G and 80B, thereby projecting the read light on a screen (not shown). Further, the color synthesis is effected on the screen.

Next, a fourth embodiment of the present invention will be described in detail hereunder by referring to FIG. 6. Although the light-to-light conversion elements are provided with respect to each of the separated light components R, G and B in the above described first, second and third embodiments, such light-to-light elements for the light components R, G and B are constructed as one unit in the fourth embodiment.

Figure 6:
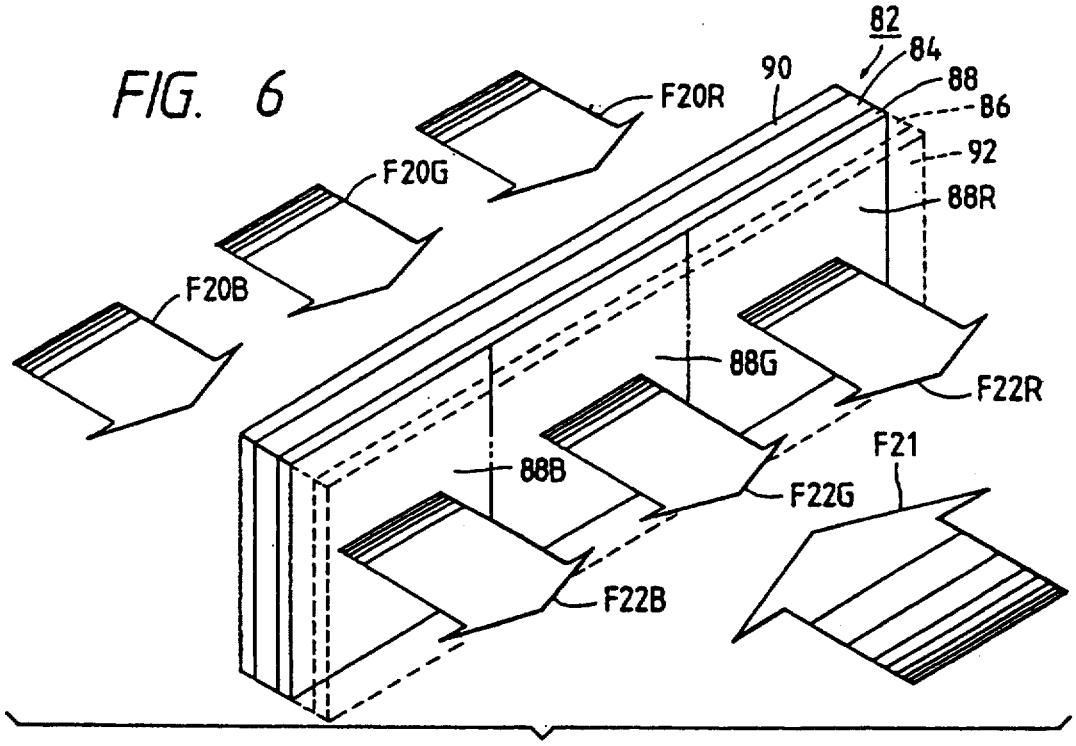
FIG. 6 is a diagram for showing the construction of a fourth embodiment of the present invention.

As shown in FIG. 6, a light-to-light element 82 is formed like a rectangular parallelepiped. Further, in the light-to-light element 82, a photoconductive layer 84, a photo-modulation layer 86, a dielectric mirror 88 and electrodes 90 and 92 are laminated. Incidentally, the photo-modulation layer 86 and the electrode 92 are indicated by dashed lines in this figure, for convenience of description.

Further, a basic operation of each of these composing portions is effected similarly as in case of the corresponding portion of the embodiment of FIG. 1. The dielectric mirror 88 has three division regions 88R, 88G and 88B of which wavelength selection characteristics are preliminarily established such that these regions 88R, 88G and 88B respectively reflect the rays of separated light R, G and B.

Moreover, the incidence of write light R, that of write light G and that of write light B on the light-to-light element 82 are respectively effected for the division regions 88R, 88G and 88B as indicated by arrows F20R, F20G and F20B in FIG. 6. On the other hand, the incidence of the read light R, G and B thereon is performed from the direction as indicated by an arrow F21. Further, the rays of the read light R, G and B are selectively reflected by the division regions 88R, 88G and 88B of the dielectric mirror 88 and are outputted therefrom as indicated by arrows F22R, F22G and F22B, respectively.

Figure 7A:
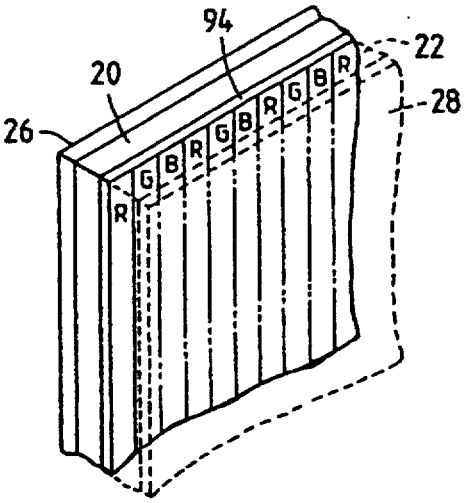
FIGS. 7 (A) and (B) are diagrams for showing the construction of a fifth embodiment of the present invention.
Figure 7B:
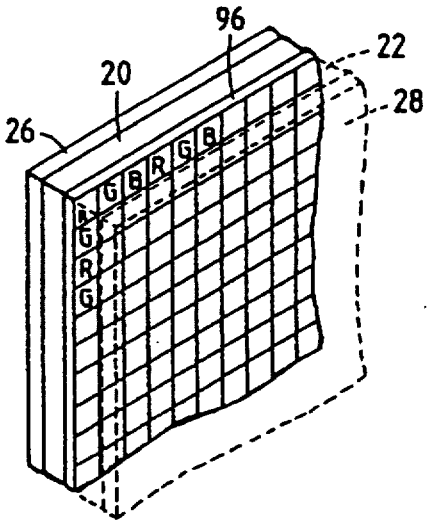
Figure 8:
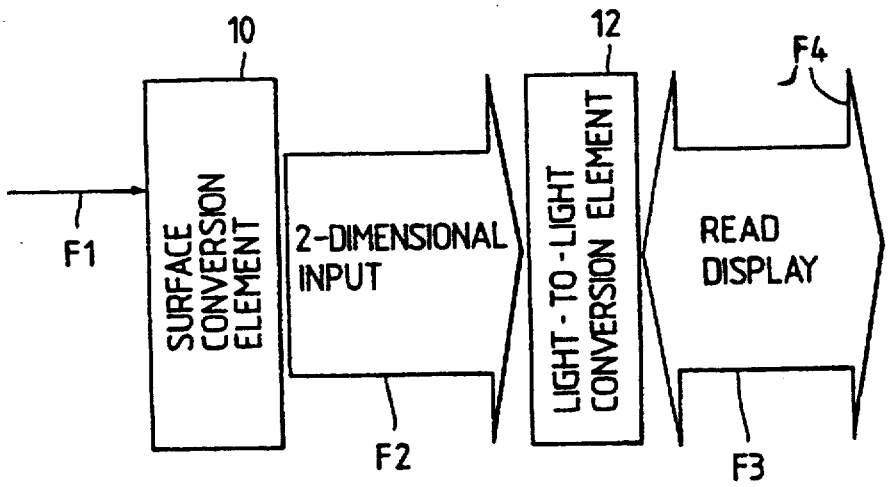
FIG. 8 (PRIOR ART)
FIG. 8 is a diagram for illustrating the construction of a light-to-light conversion device of the related art.

Next, a fifth embodiment of the present invention will be detailedly described hereinbelow by referring to FIG. 7. First, as shown in FIG. 7 (A), an example of the construction of the fifth embodiment is provided with a light-to-light conversion element which has a dielectric mirror 94 made up of stripe-like division regions which selectively reflect separated light components R, G and B. Further, as shown in FIG. 7 (B), another example of the construction of the fifth embodiment is provided with a light-to-light conversion element which has a dielectric mirror 96 composed of matrix-like division regions which selectively reflect separated light components R, G and B.

In accordance with this embodiment, white light or light obtained by mixing red, green and blue light components together is incident on the whole dielectric mirror of which each division region reflects the light having a corresponding wavelength. Thereby, operations of writing information into and reading information from the device is effected. Incidentally, in case of this embodiment, it is unnecessary to perform color synthesis.

Further, it is to be understood that the present invention is not limited to the above described embodiments. For example, the polarizing plate 32 is not necessarily provided in the device and may be provided in the device if necessary. Further, the fifth embodiment may be used as a displaying device by looking straight on the light-to-light element or device. Moreover, it is to be understood that other modifications may be made by variously altering the design of the device by combining the above described embodiments with each other.

Furthermore, although the above described embodiments are obtained by applying the present invention to a displaying apparatus, the present invention may be applied to an image sensing device. For example, the light-to-light conversion device of the present invention may be used as an image sensing device by being provided with a photoelectric conversion element and performing the scan by deflecting a pencil beam. Further, although the above described embodiments are used for displaying a color image, it is possible to make the embodiment process information on electro-magnetic radiation flux having other wavelengths by appropriately establishing the wavelength to be selected by the dielectric mirror.

Next, another preferred embodiment of the present invention will be described in detail by referring to FIG. 9 which is a schematic block diagram for showing the construction of a light-to-light conversion element embodying the present invention.

Figure 9:
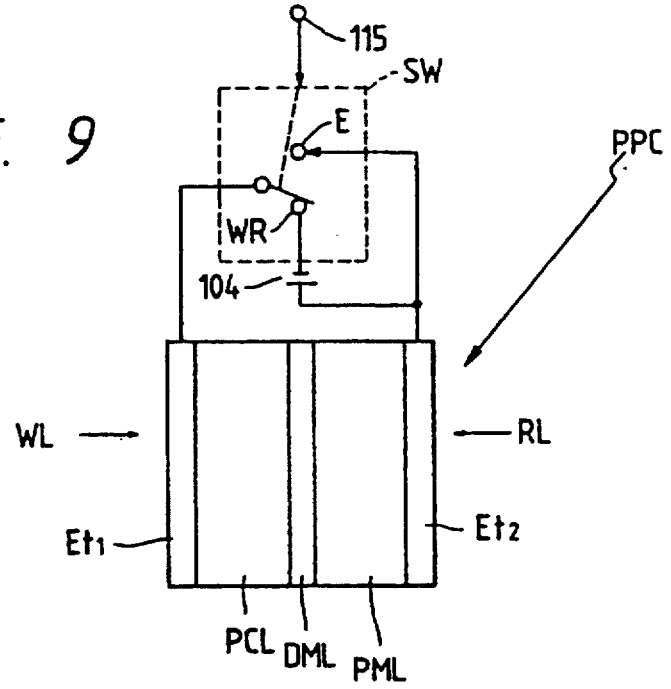
FIG. 9 is a schematic block diagram for showing the construction of another light-to-light conversion element embodying the present invention.

In FIG. 9, reference character PPC denotes a light-to-light conversion element (hereunder sometimes referred to as a wavelength conversion element); Et1 and Et2 electrodes; PCL a photoconductive material layer member sensitive to at least an invisible electro-magnetic radiation beam; DML a dielectric mirror reflecting an electro-magnetic radiation beam having wavelength of a predetermined region or range (the dielectric mirror DML is assumed to reflect a visible electro-magnetic radiation beam in the following description); PML a photo-modulation material layer member (for example, a photo-modulation material layer such as a single crystal of lithium niobate or a nematic liquid crystal layer) capable of changing the state of at least a visible electro-magnetic radiation beam; WL a invisible electro-magnetic radiation beam to be converted by the conversion element PPC; and RL a visible electro-magnetic radiation beam. Further, the electrode Et1 is constructed as "transparent" for at least the invisible electro-magnetic radiation beam to be converted (that is, the electrode Et1 is constructed in such a manner to transmit at least the invisible electro-magnetic radiation beam to be converted). On the other hand, the electrode Et2 is constructed as "transparent" for at least the visible electro-magnetic radiation beam (that is, the electrode Et2 is constructed in such a manner to transmit at least the visible electro-magnetic radiation beam).

As shown in FIG. 9, a circuit consisting of a power source 104 and a switch SW is connected to the electrodes Et1 and Et2 of the light-to-light conversion element PPC. Further, a movable contact of the switch SW is placed in the position of a fixed contact WR in accordance with a switch control signal supplied at an input terminal 115 of the switch SW. Then, a voltage from the power source 104 is applied across the electrodes Et1 and Et2 such that an electric field be applied across the photoconductive material layer PCL. Hereupon, when the invisible electro-magnetic radiation beam WL to be converted is incident on the electrode Et1 of the conversion element PPC, the invisible electro-magnetic radiation beam WL passes through the electrodes Et1 and reaches the photoconductive layer material member PCL.

The electric resistance of the photoconductive material layer member PCL changes correspondingly to intensity distribution of the invisible electro-magnetic radiation beam WL, which is to be converted and has reached thereto, so that electric charges having intensity distribution (that is, a charge image) corresponding to the intensity distribution of the invisible electro-magnetic radiation beam WL are generated on the boundary surface between the photoconductive material layer member PCL and the dielectric mirror DML.

Thereafter, in the above described state in which the movable contact of the switch SW is placed in the position of the fixed contact WR thereof and the voltage from the power source 104 is applied across the electrodes Et1 and Et2, the visible electro-magnetic radiation beam RL having uniform intensity and coming from an electro-magnetic radiation beam source (not shown) is incident on the electrode Et2, and is reflected by the dielectric mirror DML after passing through the photo-modulation material layer member PML (for instance, the single crystal of lithium niobate PML). Then, the visible electro-magnetic radiation beam RL passes through the photo-modulation material layer member PML again and is further outputted or issued from the electrode Et2 of the conversion element PPC. At that time, the state of the visible electro-magnetic radiation beam RL is changed or modulated correspondingly to the charge distribution of the charge image generated on the boundary surface between the photoconductive material layer member PCL and the dielectric mirror DML.

Namely, in the above described state in which the invisible electro-magnetic radiation beam WL is incident on the conversion element PPC and the charge image corresponding to the intensity distribution of the invisible electro-magnetic radiation beam WL is generated on the boundary surface between the photoconductive material layer member PCL and the dielectric mirror DML, an electric field having strength distribution corresponding to the charge distribution of the charge image is applied to the photo-modulation material layer member PML (for example, the single crystal of lithium niobate PML) which is connected in series to the photoconductive material layer member PCL along with the dielectric mirror DML.

Further, in case where the photo-modulation material layer member PML is, for instance, the single crystal of lithium niobate, the refractive index of the photo-modulation material layer member PML changes due to electrooptic effects correspondingly to an electric field. Therefore, when the electric field having intensity distribution corresponding to the charge image is applied to the single crystal of lithium niobate, the refractive index of the single crystal of lithium niobate used as the photo-modulation material layer member PML changes correspondingly to the charge distribution of the charge image.

Moreover, in case where the visible electro-magnetic radiation beam RL is projected on the electrodes Et2, the visible electro-magnetic radiation beam RL propagates through the electrode Et2 and the single crystal of lithium niobate PML used as the photo-modulation material layer member in this order. Subsequently, the visible electro-magnetic radiation beam RL is reflected by the dielectric mirror DML and then returns to the electrode Et2. However, as above described, the refractive index of the single crystal of lithium niobate used as the photo-modulation material layer member PML changes due to the electrooptic effects correspondingly to the electric field. Thus, the visible electro-magnetic radiation beam RL reflected by the dielectric mirror DML comes to include information corresponding to the strength distribution of an electric field applied to the single crystal of lithium niobate PML used as the photo-modulation material layer member by the electrooptic effects of the single crystal of lithium niobate PML and is further outputted from the electrode Et2. Namely, the conversion element PPC of FIG. 9 performs the wavelength conversion of the invisible electro-magnetic radiation beam, which is incident thereon, into the visible electro-magnetic radiation beam and further issues the converted visible electro-magnetic radiation beam.

Furthermore, erasure of the charge image thus formed by the invisible electro-magnetic radiation beam WL to be converted is effected by supplying a switch control signal to the input terminal 115 of the switch SW to place the movable contact of the switch SW in the fixed contact thereof, then equalizing electric potentials of the electrodes Et1 and Et2 of the conversion element and further making an electro-magnetic radiation beam having uniform intensity distribution be incident thereon and then letting the incident electro-magnetic radiation beam pass the photoconductive material layer member PCL.

Figure 10:
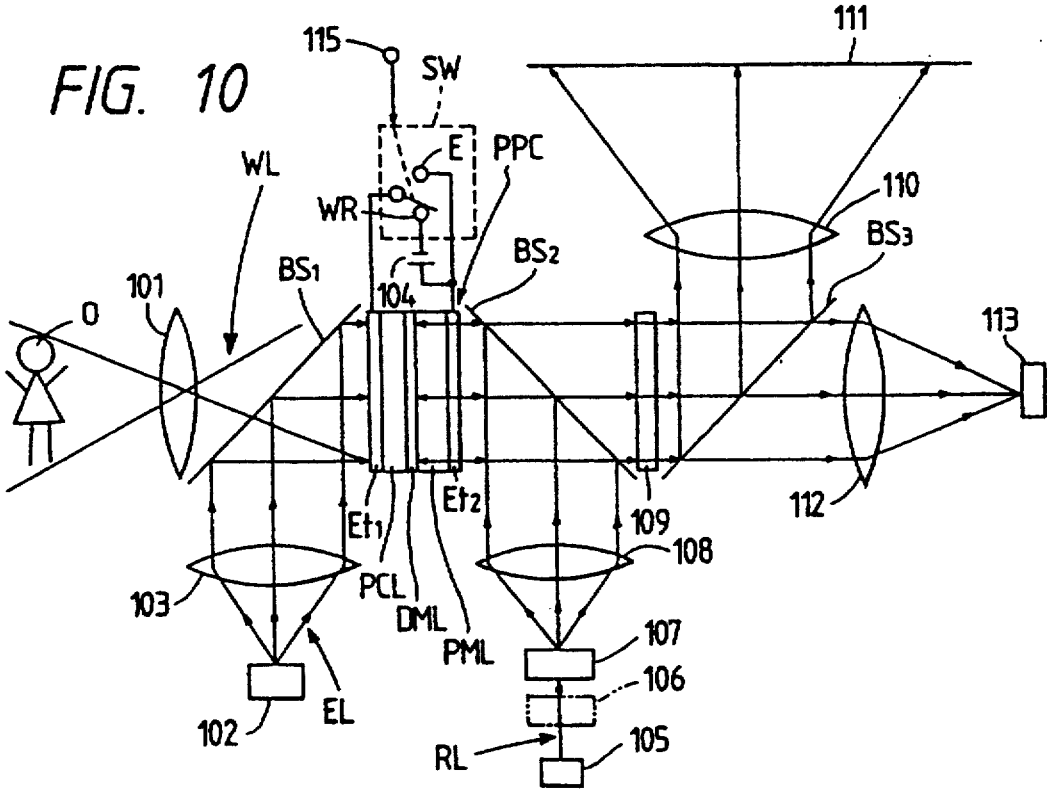
FIGS. 10 and 11 are schematic block diagrams for showing the construction of light-to-light conversion devices using the light-to-light conversion elements of FIG. 9.
Figure 11:
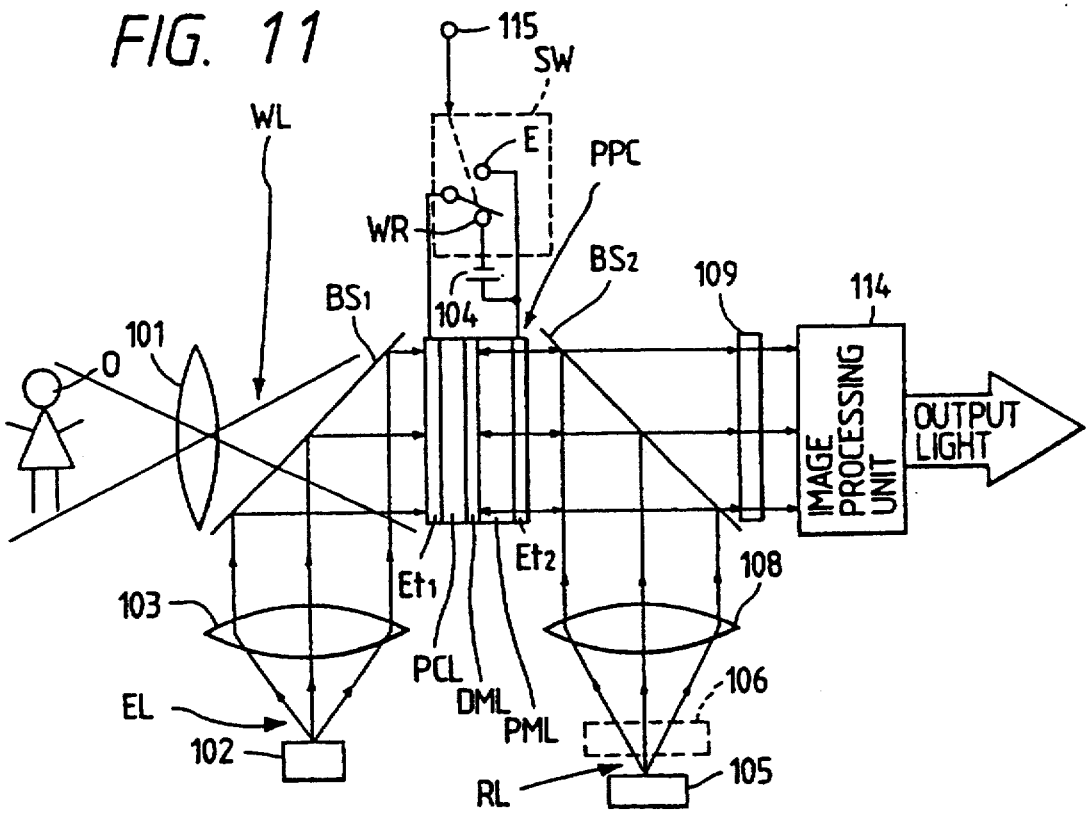

Next, other preferred embodiments of the present invention will be further described hereinbelow by referring to FIGS. 10 and 11 which are schematic block diagrams for showing the construction of each of different light-to-light conversion devices using the light-to-light conversion element of FIG. 9 embodying the present invention in case where these light-to-light conversion devices are employed as imaging devices. In FIGS. 10 and 11, reference character 0 denotes an object; 1 an imaging lens; and PPC the conversion element of FIG. 9, that is, the conversion element wherein the photoconductive material layer member sensitive to at least an invisible electro-magnetic radiation beam and the photo-modulation material layer member capable of changing the state of at least a visible electro-magnetic radiation beam in accordance with the field strength distribution are provided between two electrodes.

Further, in these figures, reference character 102 denotes an electro-magnetic radiation beam source for issuing an electro-magnetic radiation beam to be used for erasing a charge image; 103 and 108 collimator lenses; 104 a power source; 105 a visible electro-magnetic radiation beam source; 106 a polarizer provided if necessary; 109 an analyzer; BS1 and BS2 beam splitters; 115 an input terminal for inputting switching signals therefrom; and SW a switch.

Furthermore, in FIG. 10, reference character BS3 denotes a beam splitter; 107 a deflection device for deflecting an electro-magnetic radiation beam; 110 a projecting lens; 111 a screen; 112 a condenser lens; and 113 a photoelectric conversion device. Moreover, in FIG. 11, reference numeral 114 denotes an image processing unit.

In the conversion devices each constructed by using the light-to-light conversion elements of the present invention as shown in FIGS. 10 and 11, an invisible electro-magnetic radiation beam, which is to be converted, issued from the object 0 is supplied through the imaging lens 101 to the conversion element PPC, to which erasing light EL can be supplied through a path consisting of the electro-magnetic radiation beam source 102 for erasure of a charge image, the collimator lens 103 and the beam splitter BS1.

Further, in the conversion devices of the present invention of FIG. 10, a visible electro-magnetic radiation beam RL, which is deflected in a predetermined two-dimensional deflection manner, is supplied to the conversion element PPC through a path composed of the visible electro-magnetic radiation beam source 105, the polarizer 106 provided if necessary, the deflection device 107 for deflecting an electro-magnetic radiation beam, the collimator lens 108 and the beam splitter BS2. On the other hand, in the conversion devices of the present invention of FIG. 11, a visible electro-magnetic radiation beam flux RL, which has an effective section area nearly equal to or larger than the area of the electrode of the conversion element PPC, is supplied to the conversion element PPC through a path comprised of the visible electro-magnetic radiation beam source 105, the polarizer 106 provided if necessary, the collimator lens 108 and the beam splitter BS2.

Moreover, in the conversion devices of the present invention of FIGS. 10 and 11, under the conditions that the movable contact of the switch SW of the circuit, which comprises the power source 104 and the switch SW, connected to the electrodes Et1 and Et2 of the conversion element PPC is placed in the fixed contact WR in accordance with the switching signal supplied to the input terminal 115 thereof and that the voltage from the power source 104 is applied across the electrodes Et1 and Et2 so that an electric field is applied across the both ends of the photoconductive material layer member PCL, when the invisible electro-magnetic radiation beam WL, which is to be converted, coming from the object O is incident on the electrode Et1 of the conversion element PPC through the imaging lens 101, the invisible electro-magnetic radiation beam WL passes through the electrode Et1 and further reaches the photoconductive material layer member PCL.

Furthermore, as described above, the electric resistance of the photoconductive material layer member PCL changes correspondingly to intensity distribution of the invisible electro-magnetic radiation beam WL, which is to be converted and has reached thereto. Thus, a charge image having intensity distribution corresponding to the intensity distribution of the invisible electro-magnetic radiation beam WL is formed on the boundary surface between the photoconductive material layer member PCL and the dielectric mirror DML.

Then, in the above described state in which the movable contact of the switch SW is placed in the position of the fixed contact WR thereof and the voltage from the power source 104 is applied across the electrodes Et1 and Et2, the visible electro-magnetic radiation beam RL having uniform intensity is supplied in a predetermined two-dimensional deflection manner through the path composed of the visible electro-magnetic radiation beam source 105, the polarizer 106 provided if necessary, the deflection device 107 for deflecting an electro-magnetic radiation beam, the collimator lens 108 and the beam splitter BS2 in the conversion devices of the present invention of FIG. 10. Further, in the conversion devices of the present invention of FIG. 11, the visible electro-magnetic radiation beam flux RL, which has an effective section area nearly equal to or larger than the area of the electrode of the conversion element PPC, is incident on the electrode Et2 through the path comprised of the visible electro-magnetic radiation beam source 105, the polarizer 106 provided if necessary, the collimator lens 108 and the beam splitter BS2.

Furthermore, in the embodiments of FIGS. 10 and 11, the visible electro-magnetic radiation beam RL, which is incident on the electrode Et2, is reflected by the dielectric mirror DML after passing through the photo-modulation material layer member PML (for instance, the single crystal of lithium niobate PML). Thereafter, the visible electro-magnetic radiation beam RL passes through the photo-modulation material layer member PML again and is further issued from the electrode Et2 of the conversion element PPC. At that time, the state of the visible electro-magnetic radiation beam RL is changed or modulated correspondingly to the charge distribution of the charge image generated on the boundary surface between the photoconductive material layer member PCL and the dielectric mirror DML.

Namely, in case where the visible electro-magnetic radiation beam RL is projected on the electrodes Et2, the visible electro-magnetic radiation beam RL propagates through the electrodes Et2 and the single crystal of lithium niobate PML used as the photo-modulation material layer member in this order. Subsequently, the visible electro-magnetic radiation beam RL is reflected by the dielectric mirror DML and then returns to the electrode Et2. However, as above described, the refractive index of the single crystal of lithium niobate used as the photo-modulation material layer member PML changes due to the electrooptic effects correspondingly to the electric field. Thus, the visible electro-magnetic radiation beam RL reflected by the dielectric mirror DML comes to include information corresponding to the strength distribution of an electric field applied to the single crystal of lithium niobate PML used as the photo-modulation material layer member by the electrooptic effects of the single crystal of lithium niobate PML and is further issued from the electrode Et2. Further, the issued visible electro-magnetic radiation beam is supplied to the analyzer 109 after passing through the beam splitter BS2.

The intensity of the visible electro-magnetic radiation beam RL, which has passed through the analyzer 109 as above described, changes correspondingly to the charge distribution of the charge image generated on the boundary surface between the photoconductive material layer member PCL and the dielectric mirror DML of the conversion element PPC.

Further, in the conversion device of the present invention of FIG. 10, the visible electro-magnetic radiation beam RL, which has passed through the analyzer 109 as above described, is reflected by the beam splitter BS3 and then a visible optical image is formed on the screen through the projecting lens 110. Moreover, the visible electro-magnetic radiation beam RL, which has passed through the analyzer 109 as above described, is fed to the photoelectric conversion device 113 through the beam splitter BS3 and the condenser lens 112 and is then outputted from the device 113 as an electric signal.

In the conversion device of the present invention of FIG. 11, the visible electro-magnetic radiation beam RL, which has passed through the analyzer 109 as above described, is supplied to the image processing unit 114 for effecting various optical image processing (for example, matrix processing such as matrix multiplication, non-linear processing, contour enhancement processing and gain regulating processing) whereupon predetermined image processing is effected. Then, the result of the image processing is outputted by using visible light. Incidentally, the optical image processing unit may be constructed by using a light-to-light conversion element, a polarizer, a light source capable of regulating quantity of light, a beam splitter and an optical low-pass filter as components thereof.

Further, in case of the conversion device of FIG. 10 according to the present invention, a visible electro-magnetic radiation beam is obtained as a result of the wavelength conversion from the conversion element PPC by using the visible electro-magnetic radiation beam RL deflected by the deflection device 107 in the two-dimensional manner. In contrast, in case of the conversion device of FIG. 11 according to the present invention, a visible electro-magnetic radiation beam is obtained as a result of the wavelength conversion from the conversion element PPC by using the visible electro-magnetic radiation beam RL having a large section. However, in these embodiments, the deflection device 107 of FIG. 10 may be removed therefrom and the photoelectric conversion device 113 of FIG. 10 may be replaced with a two-dimensional image sensor. Further, the deflection device 107 may be provided just prior to the collimator lens 108 of FIG. 11.

Moreover, it is to be understood that various other modifications and changes may be made therein.

Next, in the conversion devices each constructed by using the light-to-light conversion elements of the present invention as shown in FIGS. 10 and 11, erasure of the charge image thus formed by the invisible electro-magnetic radiation beam WL to be converted can be effected by supplying a switch control signal to the input terminal 15 of the switch SW to place the movable contact of the switch SW in the fixed contact E thereof, then equalizing electric potentials of the electrodes Et1 and Et2 of the conversion element and further making an electro-magnetic radiation beam having uniform intensity distribution be incident thereon through a path composed of the electro-magnetic radiation beam source 102 for the erasure of the charge image, the collimator lens 103 and the beam splitter BS1 and thereafter letting the incident electro-magnetic radiation beam pass the photoconductive material layer member PCL.

Incidentally, in case where a dielectric mirror DML having a wavelength selection characteristic by which a visible electro-magnetic radiation beam is reflected and the electro-magnetic radiation beam for the erasure is made to pass therethrough, the conversion device is constructed by making the direction of the electro-magnetic radiation beam same with that of the incidence of the visible electro-magnetic radiation beam for the erasure. Further, the conversion device of the present invention may be used as an image sensing device by being provided with a photoelectric conversion element and performing the scan by deflecting a pencil beam.

Next, still another light-to-light conversion element embodying the present invention will be described in detail by referring to FIG. 12.

In this figure, reference character PPC denotes a light-to-light conversion element; Et1 and Et2 electrodes; PCL a photoconductive material layer member sensitive to at least an electro-magnetic radiation beam to be used for writing information and practically insensitive to an electro-magnetic radiation beam to be used for reading information; PML a photo-modulation material layer member (for example, a photo-modulation material layer such as a single crystal of lithium niobate or a nematic liquid crystal layer) capable of changing the state of at least the electro-magnetic radiation beam to be used for reading the information; WL the electro-magnetic radiation beam to be used for writing the information; and RL the electro-magnetic radiation beam to be used for reading the information. Further, the electrode Et1 is constructed as "transparent" for at least the electro-magnetic radiation beam to be used for writing the information (hereunder sometimes referred to simply as the write electro-magnetic radiation beam). On the other hand, the electrode Et2 is constructed as "transparent" for at least the electro-magnetic radiation beam to be used for reading the information (hereunder sometimes referred to simply as the read electro-magnetic radiation beam).

Figure 12:
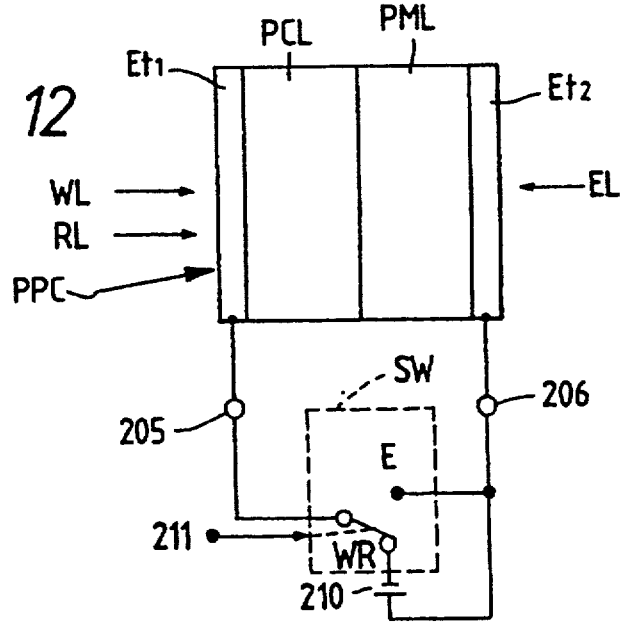
FIG. 12 is a schematic block diagram for showing the construction of still another light-to-light conversion element embodying the present invention.

As shown in FIG. 12, a circuit consists of a power source 210 and a switch SW is connected to the electrodes Et1 and Et2 of the light-to-light conversion element PPC. Further, a movable contact of the switch SW is placed in the position of a fixed contact WR in accordance with a switch control signal supplied at an input terminal 211 of the switch SW. Then, a voltage from the power source 210 is applied across the electrodes Et1 and Et2 such that an electric field be applied across the photoconductive material layer PCL. Hereupon, when the write electro-magnetic radiation beam WL is made to be incident on the electrode Et1 of the conversion element PPC, the write electro-magnetic radiation beam WL passes through the electrodes Et1 and reaches the photoconductive layer material member PCL.

Further, the electric resistance of the photoconductive material layer member PCL changes correspondingly to intensity distribution of the write electro-magnetic radiation beam WL reached thereto, so that a charge image having intensity distribution corresponding to the intensity distribution of the write electro-magnetic radiation beam WL having reached to the photoconductive material layer member PCL is generated on the boundary surface between the photoconductive material layer member PCL and the photo-modulation material layer member PML.

Then, under the above described condition that the movable contact of the switch SW is placed in the position of the fixed contact WR thereof and the voltage from the power source 210 is applied across the electrodes Et1 and Et2, the read electro-magnetic radiation beam RL having constant intensity and coming from an electro-magnetic radiation beam source (not shown) is made to be incident on the electrode Et2. The read electro-magnetic radiation beam RL passes through the photoconductive material layer member PCL and the photo-modulation material layer member PML (for instance, the single crystal of lithium niobate PML). Thereafter, the read electro-magnetic radiation beam RL is outputted or issued from the electrode Et2 of the conversion element PPC. At that time, the state of the read electro-magnetic radiation beam RL is changed correspondingly to the charge distribution of the charge image generated on the boundary surface between the photoconductive material layer member PCL and the photo-modulation material layer member PML (for instance, the single crystal of lithium niobate PML).

Namely, under the above described condition that the write electro-magnetic radiation beam WL is incident on the conversion element PPC and the charge image corresponding to the intensity distribution of the write electro-magnetic radiation beam WL is generated on the boundary surface between the photoconductive material layer member PCL and the photo-modulation material layer member PML (for example, the single crystal of lithium niobate PML), an electric field having strength distribution corresponding to the charge distribution of the charge image is applied to the photo-modulation material layer member PML (for example, the single crystal of lithium niobate PML) which is connected in series to the photoconductive material layer member PCL along with the dielectric mirror DML.

Further, in case where the photo-modulation material layer member PML is, for instance, the single crystal of lithium niobate, the refractive index of the photo-modulation material layer member PML changes due to electrooptic effects correspondingly to an electric field. Thus, when the electric field having strength distribution corresponding to the charge image is applied to the single crystal of lithium niobate, the refractive index of the single crystal of lithium niobate used as the photo-modulation material layer member PML changes correspondingly to the charge distribution of the charge image.

Moreover, in case where the read electro-magnetic radiation beam RL is incident on the electrodes Et1, the read electro-magnetic radiation beam RL propagates through the electrode Et1, the photoconductive material layer member PCL, the single crystal of lithium niobate PML and the electrode Et2 in this order. However, as above described, the refractive index of the single crystal of lithium niobate used as the photo-modulation material layer member PML changes due to the electrooptic effects correspondingly to the electric field. Thus, the read electro-magnetic radiation beam RL comes to include information, which corresponds to the strength distribution of an electric field applied to the single crystal of lithium niobate PML used as the photo-modulation material layer member, by the electrooptic effects of the single crystal of lithium niobate PML and is further issued from the electrode Et2.

Further, in the conversion element PPC of FIG. 12, the photoconductive material layer member PCL thereof is practically insensitive to the read electro-magnetic radiation beam RL. Therefore, even when the read electro-magnetic radiation beam RL passes through the photoconductive material layer member PCL, there occur no photoconductive effects. Thus, even when the read electro-magnetic radiation beam RL passes through the photoconductive material layer member PCL, the charge image present on the boundary surface between the photoconductive material layer member PCL and the photo-modulation material layer member PML is never disturbed.

Furthermore, erasure of the charge image thus formed by the write electro-magnetic radiation beam WL is effected by supplying a switch control signal to the input terminal 211 of the switch SW to place the movable contact of the switch SW in the fixed contact E thereof, then equalizing electric potentials of the electrodes Et1 and Et2 of the conversion element and further making an electro-magnetic radiation beam, to which the photoconductive material layer member PCL is sensitive, having uniform intensity distribution be incident thereon and then letting the incident electro-magnetic radiation beam pass the photoconductive material layer member PCL.

Moreover, in case of the light-to-light conversion element in which a liquid crystal is used as material of the photoconductive material layer member, the erasure of the charge image is performed by supplying an a. c. voltage to the electrodes Et1 and Et2.

Incidentally, the conversion element of FIG. 12 may be used as an image sensing device by being provided with a photoelectric conversion element and performing the scan by deflecting a pencil beam.

Furthermore, as material of the photoconductive material layer member, for example, cadmium sulfide (CdS) and a bismuth silicon oxide ($Bi_{12}SiO_{20}$) may be employed.

Figure 16:
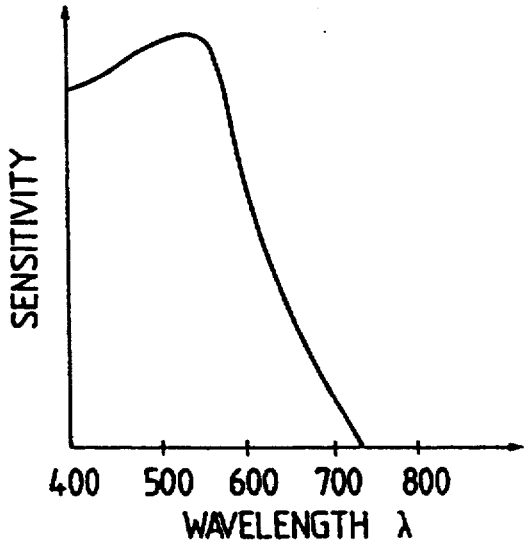
FIG. 16 is a graph for showing the sensitivity characteristic of CdS used as a material of a photoconductive material layer member of the light-to-light conversion element embodying the present invention.
Figure 17:
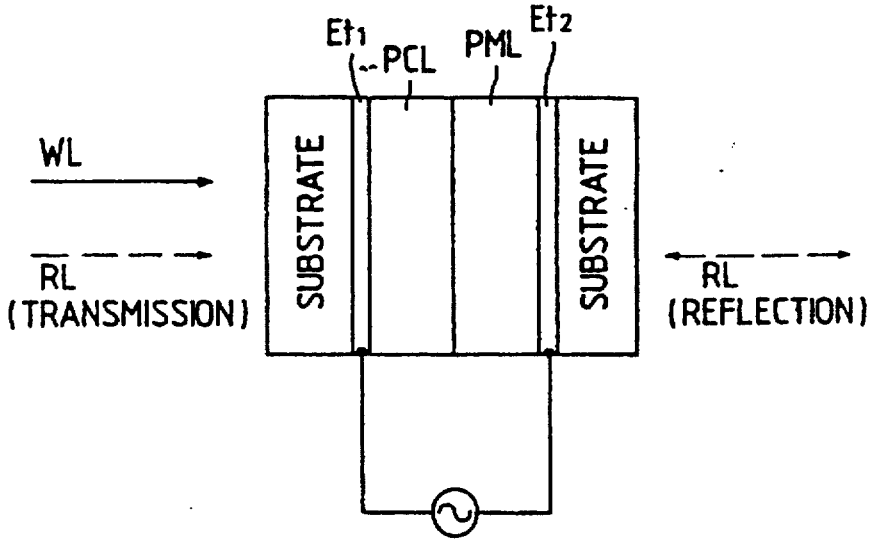
FIG. 17 is a schematic block diagram for showing the construction of the light-to-light conversion element of the present invention in case where CdS is employed as a material of a photoconductive material layer member thereof.

For instance, CdS has sensitivity characteristics as shown in FIG. 16 and thus is sensitive to visible light and is practically insensitive to infrared light of which the wavelength is larger than or equal to 750 nanometers (nm). FIG. 17 shows the construction of a light-to-light conversion element using CdS as material of the photoconductive material layer member PML. In case of this conversion element, visible light is used as a write electro-magnetic radiation beam WL and on the other hand infrared light, of which the wavelength is larger than or equal to 750 nm, is used as a read electro-magnetic radiation beam RL. Further, the information written into the conversion element PPC is read by making the read electro-magnetic radiation beam RL pass through the electrode Et1 and the photoconductive material layer member PCL. Moreover, the information written into the conversion element PPC can be read from the side of the photo-modulation material layer member PML by using the difference in refractive index between the photoconductive material layer member PCL and the photo-modulation material layer member PML and using the reflection of the read electro-magnetic radiation beam RL on the boundary surface therebetween.

Figure 18:
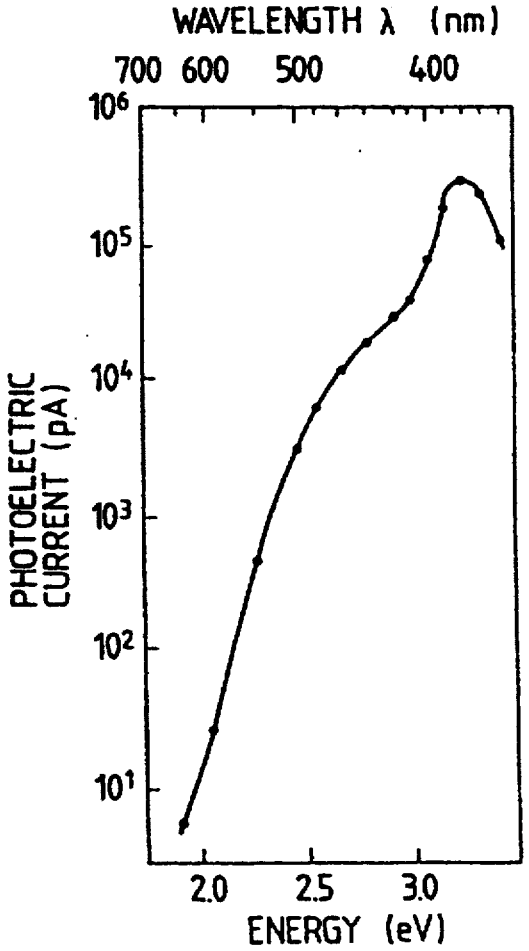
FIG. 18 is a graph for showing characteristics of a single crystal of $Bi_{12}SiO_{20}$ used as a material of a photoconductive material layer member of the light-to-light conversion element embodying the present invention.

On the other hand, FIG. 18 shows the relation between the photoconductive effect of $Bi_{12}SiO_{20}$ (hereunder abbreviated as BSO) and the wavelength. As shown in this figure, BSO has an especially dramatic photoconductive effect in the range of the wavelength of near-ultraviolet light and blue light but very little photoconductive effect in the range of the wavelength of red light. The ratio of the magnitude of the photoconductive effect at the wavelength of 370 nm to that of the photoconductive effect at the wavelength of 630 nm is about $10^3$ to $10^4$. Thus, in this case, light having a wavelength in the range from near-ultraviolet light to blue light is used as a write electro-magnetic radiation beam WL and on the other hand, light, of which the wavelength is larger than or equal to 600 nm, is used as a read electro-magnetic radiation beam RL. Thereby, a high resolution image can be written or read by the conversion device using such a conversion element.

Figure 13:
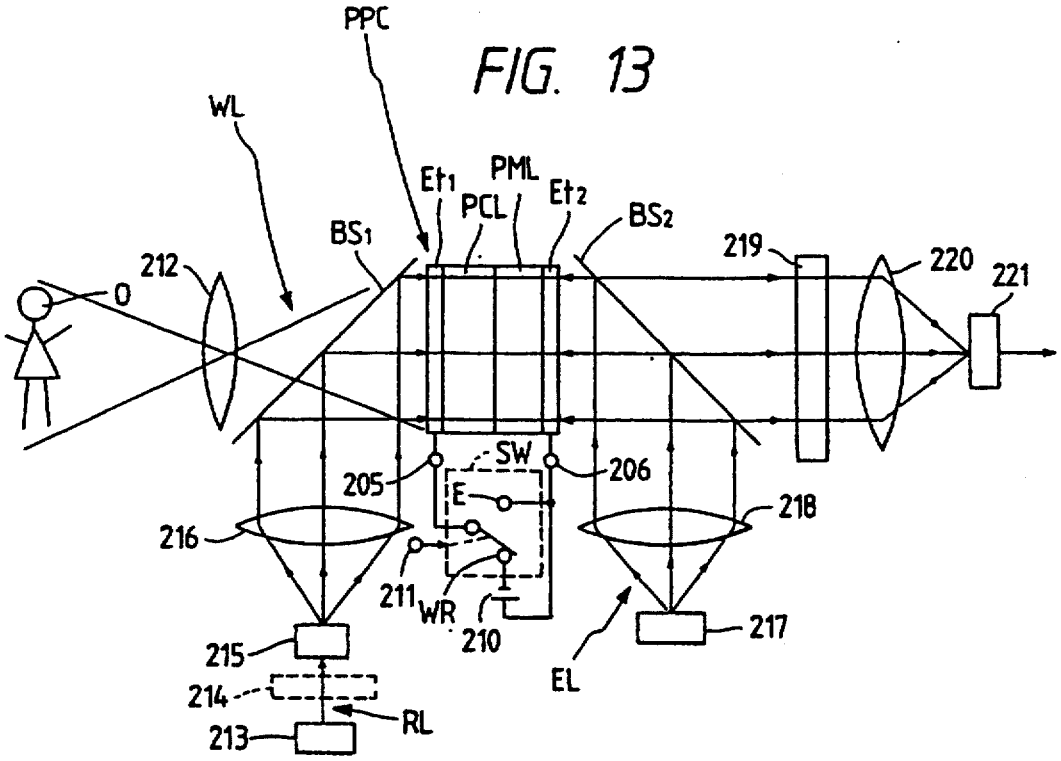
FIG. 13 is a diagram for showing an imaging device constructed by using the light-to-light conversion element of FIG. 12 embodying the present invention.
Figure 14:
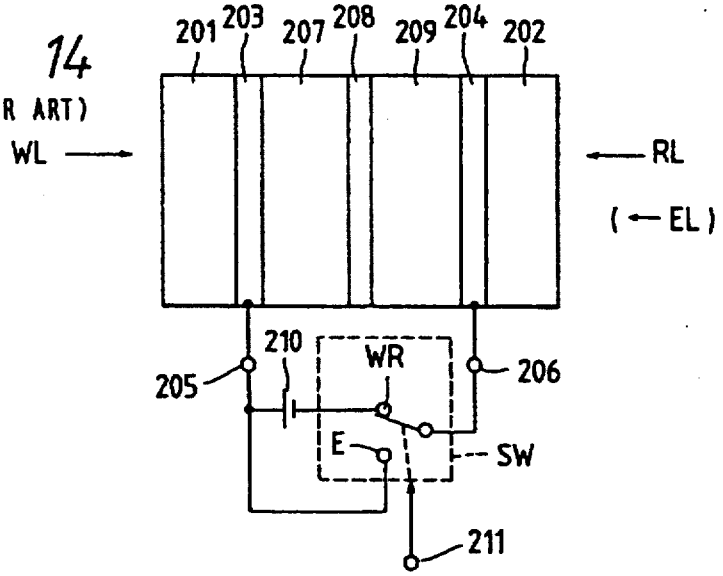
FIG. 14 (PRIOR ART)
FIG. 14 is a schematic block diagram for showing the construction of another light-to-light conversion element of the related art.
Figure 15:
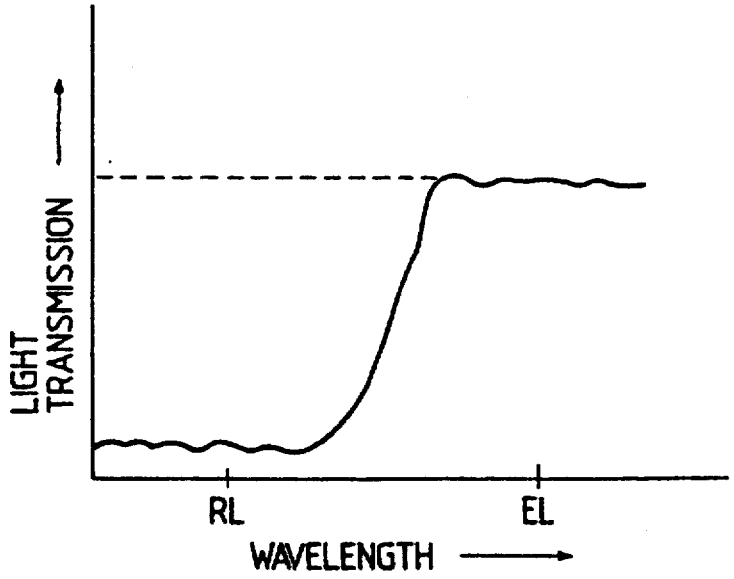
FIG. 15 is a graph for showing the transmittance characteristic of a dielectric mirror of the light-to-light conversion element of the present invention.

Next, an imaging device constructed by using the light-to-light conversion element of FIG. 12 embodying the present invention will be further described hereinbelow by referring to FIG. 13 which is a schematic block diagram for showing the construction of the imaging device using the light-to-light conversion element of FIG. 12. In FIG. 13, reference character O denotes an object; 212 an imaging lens; and PPC the conversion element of FIG. 12, that is, the conversion element wherein the photoconductive material layer member sensitive to at least the write electro-magnetic radiation beam and practically insensitive to the read electro-magnetic radiation beam and the photo-modulation material layer member capable of changing the state of at least read electro-magnetic radiation beam in accordance with the field strength distribution are provided between two electrodes.

Further, in this figure, reference character 217 denotes an electro-magnetic radiation beam source for issuing an electro-magnetic radiation beam (hereunder sometimes referred to as an erasure electromagnetic radiation beam) to be used for erasing a charge image; 216 and 218 collimator lenses; 210 a power source; 213 a read electro-magnetic radiation beam source; 214 a polarizer provided if necessary; 219 an analyzer; BS1 and BS2 beam splitters; 211 an input terminal for inputting switching signals therefrom; SW a switch; 220 a condenser lens; and 221 an electric conversion device.

In the imaging device of FIG. 13 constructed by using the light-to-light conversion elements of the present invention, an electro-magnetic radiation beam issued from the object O is supplied through the imaging lens 212 and the beam splitter BS1 to the conversion element PPC.

Further, a read electro-magnetic radiation beam RL, which is deflected in a predetermined two-dimensional deflection manner, is supplied to the conversion element PPC through a path composed of the read electro-magnetic radiation beam source 213, the polarizer 214 provided if necessary, the deflection device 215 for deflecting an electro-magnetic radiation beam, the collimator lens 216 and the beam splitter BS1.

Moreover, an erasure light or electro-magnetic radiation beam EL is supplied to the conversion element PPC through a path composed of the erasure electro-magnetic radiation beam source 217, the collimator lens 218 and the beam splitter BS2.

Furthermore, in the imaging device of the present invention of FIG. 13, under the conditions that the movable contact of the switch SW of the circuit, which comprises the power source 210 and the switch SW, connected to the electrodes Et1 and Et2 of the conversion element PPC is placed in the fixed contact WR in accordance with the switching signal supplied to the input terminal 211 thereof and that the voltage from the power source 210 is applied across the electrodes Et1 and Et2 so that an electric field is applied across the both ends of the photoconductive material layer member PCL, the write electro-magnetic radiation beam WL coming from the object O is made to be incident on the electrode Et1 of the conversion element PPC through the imaging lens 212 and the beam splitter BS1. The write electro-magnetic radiation beam WL passes through the electrode Et1 and further reaches the photoconductive material layer member PCL as above described.

Further, the photoconductive material layer member PCL is sensitive to the write electro-magnetic radiation beam and thus, when the write electro-magnetic radiation beam WL passes through the electrode Et1 and further reaches the photoconductive material layer member PCL, the electric resistance of the photoconductive material layer member PCL changes correspondingly to intensity distribution of the write electro-magnetic radiation beam WL having reached thereto. Thus, a charge image having intensity distribution corresponding to the intensity distribution of the write electro-magnetic radiation beam WL having reached to the photoconductive material layer member PCL is formed on the boundary surface between the photoconductive material layer member PCL and the photo-modulation material layer member PML.

Then, under the above described condition that the movable contact of the switch SW is placed in the position of the fixed contact WR thereof and the voltage from the power source 210 is applied across the electrodes Et1 and Et2, when the read electro-magnetic radiation beam RL, which has constant intensity and coming from an electro-magnetic radiation beam source 213, is made to be incident on the electrode Et1, in a predetermined two-dimensional deflection manner, through the path composed of the polarizer 214 provided if necessary, the deflection device 215 for deflecting an electro-magnetic radiation beam, the collimator lens 216 and the beam splitter BS1.

Moreover, the read electro-magnetic radiation beam RL, which has been incident on the electrodes Et1, propagates through the electrode Et1, the photoconductive material layer member PCL, the single crystal of lithium niobate used as the photoconductive material layer member PML and the electrode Et2 in this order. However, as above described, the refractive index of the single crystal of lithium niobate used as the photo-modulation material layer member PML changes due to the electrooptic effects correspondingly to the electric field. Thus, the read electro-magnetic radiation beam RL comes to include information, which corresponds to the strength distribution of an electric field applied to the single crystal of lithium niobate PML used as the photo-modulation material layer member, by the electrooptic effects of the single crystal of lithium niobate PML and is further issued from the electrode Et2. Then, the thus issued beam RL passes through the beam splitter BS2 and is thereafter supplied to the analyzer 219.

Furthermore, the intensity of the read electro-magnetic radiation beam RL, which has passed through the analyzer 109 as above described, changes correspondingly to the charge distribution of the charge image generated on the boundary surface between the photoconductive material layer member PCL and the photo-modulation material layer member PML of the conversion element PPC.

Further, the read electro-magnetic radiation beam RL, which has passed through the analyzer 109 as above described, is condensed by condenser lens 220 and as a result is fed to the photoelectric conversion device 221 whereupon the condensed electro-magnetic radiation beam is converted into an electric signal. Further, the electrical signal is outputted from the photoelectric conversion device 221.

Then, the erasure of the charge image thus formed by the write electro-magnetic radiation beam WL is effected by supplying a switch control signal to the input terminal 211 of the switch SW to place the movable contact of the switch SW in the fixed contact E thereof, then equalizing electric potentials of the electrodes Et1 and Et2 of the conversion element and further making an erasure electro-magnetic radiation beam EL, to which the photoconductive material layer member PCL is sensitive, generated by the erasure electro-magnetic radiation beam source 217 and having uniform intensity distribution be incident on the electrode Et2 of the light-to-light conversion element PPC and then letting the incident electro-magnetic radiation beam pass the photo-modulation material layer member PML and the photoconductive material layer member PCL.

As stated above, in case of the light-to-light conversion imaging device in which a liquid crystal is used as material of the photoconductive material layer member, the erasure of the charge image is performed by supplying an a. c. voltage to the electrodes Et1 and Et2 of the conversion device.

Further, the imaging device described by referring to FIG. 13 is constructed such that the read electro-magnetic radiation beam RL is made to be incident on the electrode Et1 of the light-to-light conversion element PPC and is further issued from the electrode Et2 through a path comprised of the electrode Et1, the photoconductive material layer member PCL, the photo-modulation material layer member PML and the electrode Et2. However, the imaging device of the present invention may be constructed in the manner that the light-to-light conversion element provided with a photoconductive material layer member sensitive to at least the write electro-magnetic radiation beam and insensitive to the read electro-magnetic radiation beam and capable of reflecting the read electro-magnetic is employed and that the read electro-magnetic material layer member RL is made to be incident on the electrode Et2 of the light-to-light conversion element PPC and to pass the photo-modulation material layer member and thereafter the read electro-magnetic radiation beam RL is made to reflect on the boundary surface between the photoconductive material layer member PCL and the photo-modulation material layer member PML and then the read electro-magnetic radiation beam RL is made to pass the photo-modulation material layer member PML and is further issued from the electrode Et2.

Incidentally, it is apparent that the imaging device of the present invention may be constructed such that operations of writing and reading information can be performed by using light in a broad sense, namely, electro-magnetic radiation beams of all or part of spectra (thus including radiowaves from short waves such as $\gamma$ rays and X rays to long waves).

While preferred embodiments of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A light-to-light conversion element for use in an image displaying or sensing device, comprising:

a photoconductive layer responsive to a first incident light, which includes image information to be written thereinto, thereon for generating electric charge corresponding to the quantity of the incident light;

a photo-modulation layer for modulating a second incident light thereon, *which is used* for reading written image information, by using electrooptic effects corresponding to influence of an electric field caused by the electric charge generated in said photoconductive layer; and a light reflecting layer interposed between said photoconductive and photo-modulation layers and having a predetermined selective reflection characteristic corresponding to color separation of the second incident light for reflecting the second incident light, wherein

[each of said photoconductive layer and] said photo-modulation layer has a transmission characteristic by which [each of said photoconductive layer and] said photo-modulation layer can transmit light of wavelength of a range being broader than a range of wavelength of light reflected by said light reflecting layer.

2. An image displaying apparatus including:

first, second and third light-to-light conversion elements each having a photoconductive layer responsive to light for generating an electric charge corresponding to quantity of the light, a photo-modulation layer for modulating received light by using electrooptic effects corresponding to influence of an electric field caused by the electric charge generated in said photoconductive layer and a light reflecting layer integrated between said photoconductive and photo-modulation layers and having a predetermined selective reflection characteristic for selectively reflecting light, said reflecting layer of said first light-to-light conversion element having a selective reflection characteristic to reflect red light, said reflecting layer of said second light-to-light conversion element having a selective reflection characteristic to reflect green light, said reflecting layer of said second light-to-light conversion element having a selective reflection characteristic to reflect blue light; and color separation means for effecting the color separation of first incident light, which includes image information to be written into said first, second and third light-to-light conversion elements, and second incident light used for reading the written image information to obtain red, green and blue composing light, for introducing the red, green and blue composing light to said photo-modulation layers of said first, second and third light-to-light conversion elements, respectively, and for receiving and transmitting light reflected by said photo-modulation layers of said first, second and third light-to-light conversion elements.

3. The image displaying apparatus as set forth in claim 2, wherein said color separation means comprises:

a first separation means for effecting the color separation of the first incident light to obtain red, green and blue composing light and introducing the red, green and blue composing light to said first, second and third light-to-light conversion elements, respectively; and a second separation means for effecting the color separation of the second incident light to obtain red, green and blue composing light and introducing the red, green and blue composing light to said first, second and third light-to-light conversion elements, respectively.

4. The image displaying apparatus as set forth in claim 3, wherein said first separation means includes:

a first dichroic mirror for separating composing light of a predetermined color selected from red, green and blue from the first incident light; and a second dichroic mirror for separating composing light of the other colors of red, green and blue.

5. The image displaying apparatus as set forth in claim 3, wherein said second separation means includes:

a first dichroic mirror for separating composing light of a predetermined color, which is selected from red, green and blue, from the second incident light;

a second dichroic mirror for separating composing light of the other colors of red, green and blue from each other; and a first semi-transparent mirror for introducing the composing light of one of the other colors separated by said second dichroic mirror to a corresponding light-to-light conversion element.

6. An image displaying apparatus including:

a first, second and third light-to-light conversion element each having a photoconductive layer responsive to light for generating an electric charge corresponding to the quantity of the light, a photo-modulation layer for modulating received light by using electrooptic effects corresponding to influence of an electric field caused by the electric charge generated in said photoconductive layer and a light reflecting layer interposed between said photoconductive and photo-modulation layers and having a predetermined selective reflection characteristic for selectively reflecting the light, said reflecting layer of said first light-to-light conversion element having a selective reflection characteristic to reflect red light, said reflecting layer of said second light-to-light conversion element having a selective reflection characteristic to reflect green light, said reflecting layer of said second light-to-light conversion element having a selective reflection characteristic to reflect blue light;

image information input means for introducing [red, green and blue] write light, [each of] which includes image information to be written into said first, second and third conversion [means] *element*, to said first, second and third conversion [means] *elements*, respectively; and color separation means for effecting the color separation of first incident light used for reading the written image information to obtain red, green and blue read light and introducing the red, green and blue read light to said first, second and third light-to-light conversion elements, respectively, and for receiving and transmitting light reflected by said photo-modulation layers of said first, second and third light-to-light conversion elements.

7. The image displaying apparatus as set forth in claim 6, wherein each of the red, green and blue write light is issued from a corresponding laser light source, and wherein said image information input means comprises:

a first input means for introducing the red write light to said first light-to-light conversion means by deflecting the red write light;

a second input means for introducing the green write light to said first light-to-light conversion means by deflecting the green write light; and a third input means for introducing the blue write light to said first light-to-light conversion means by deflecting the blue write light.

8. The image displaying apparatus as set forth in claim 6, wherein said color separation means includes:

a first dichroic mirror for separating read light of a predetermined color selected from red, green and blue from the first incident light;

a second dichroic mirror for separating the read light of the other colors of red, green and blue from each other; and a first semi-transparent mirror for introducing the read light of one of the other colors separated by said second dichroic mirror to a corresponding light-to-light conversion element.

9. The image displaying apparatus as set forth in claim 3, wherein said second separation means includes:

first, second and third semi-transparent mirrors which introduce the red, green and blue composing light to corresponding light-to-light conversion elements, respectively.

10. The image displaying apparatus as set forth in claim 2, wherein said first, second and third light-to-light conversion elements are combined in a single unit.

11. The image displaying apparatus as set forth in claim 10, wherein the reflecting layers of said first, second and third light-to-light conversion elements combined in a single unit are arranged in a one-dimensional arrangement.

12. The image displaying apparatus as set forth in claim 10, wherein the reflecting layers of said first, second and third light-to-light conversion elements combined in a single unit are arranged in two-dimensional arrangement.

*13. The light-to-light conversion element according to claim 1, wherein said light reflecting layer is a dielectric mirror having the predetermined selective reflection characteristic.*

* * * * *

UNITED STATES PATENT AND TRADEMARK OFFICE

CERTIFICATE OF CORRECTION

PATENT NO. : RE. 34,947

DATED : May 23, 1995

INVENTOR(S) : Itsuo TAKANASHI et al.

It is certified that error appears in the above-indentified patent and that said Letters Patent is hereby corrected as shown below: On the title page, Item [75] should read as follows:

--Inventors: Itsuo Takanashi, Kamakura; Shintaro Nakagaki, Miura; Hirohiko Shinonaga, Utsunomiya; Masato Furuya, Yokohama, Tsutou Asakura, Yokohama; Tetsuji Suzuki, Yokosuka, all of Japan--

Item [64] should read as follows:

--Reissue of:
[64] Patent No.: 5,124,545
Issued: Jun. 23, 1992
Appl. No.: 497,164
Filed: Mar. 22, 1990--

Signed and Sealed this

Nineteenth Day of September, 1995

*Attest:*

*Attesting Officer*

BRUCE LEHMAN

*Commissioner of Patents and Trademarks*